(12) United States Patent
Angelsen et al.

(10) Patent No.: US 6,905,465 B2
(45) Date of Patent: Jun. 14, 2005

(54) CORRECTIONS FOR PULSE REVERBERATIONS AND PHASEFRONT ABERRATIONS IN ULTRASOUND IMAGING

(76) Inventors: Bjørn A. J. Angelsen, Bugges veg 4b, Trondheim (NO), 7051; Tonni F. Johansen, Osloveien 6, Trondheim (NO), 7018

( * ) Notice: Subject to any disclaimer, the term of this patent is extended or adjusted under 35 U.S.C. 154(b) by 55 days.

(21) Appl. No.: 10/408,538

(22) Filed: Apr. 7, 2003

(65) Prior Publication Data

US 2003/0199763 A1 Oct. 23, 2003

Related U.S. Application Data

(60) Provisional application No. 60/370,417, filed on Apr. 5, 2002.

(51) Int. Cl.[7] .................................................. A61B 8/00

(52) U.S. Cl. ....................................... 600/437; 600/447

(58) Field of Search ................................. 600/437–472; 73/599–633; 367/7, 11, 130, 25, 138; 128/916

(56) References Cited

U.S. PATENT DOCUMENTS

| | | | | |
|---|---|---|---|---|
| 5,465,723 A | * | 11/1995 | Angelsen et al. | ........... 600/448 |
| 5,565,627 A | * | 10/1996 | Dorr | ........................... 73/599 |
| 6,021,093 A | * | 2/2000 | Birchak et al. | ............... 367/25 |
| 6,485,423 B2 | * | 11/2002 | Angelsen et al. | ........... 600/458 |

* cited by examiner

*Primary Examiner*—Ali Imam
(74) *Attorney, Agent, or Firm*—Cohen, Pontani, Lieberman & Pavane

(57) ABSTRACT

A method of correcting for pulse reverberations in ultrasound imaging using two-dimensional transducer arrays, and uses such reduction in element signals and beam signal before estimation of corrections for phase front aberrations of the ultrasound wave. The pulse reverberation is estimated by two transmit events, where the second event is determined by measurement and processing on measurement on echoes of the first event. In a second embodiment of the invention, the reverberation is estimated by a single transmit event, using two receive beams and processing on these. In a third embodiment of the invention the reverberation from very strong scatterers is reduced by adjustment of the active transmit aperture.

22 Claims, 13 Drawing Sheets a)

b)

a)

b)

a)

b)

a)

$$H(\omega) = \frac{1 - i\omega RC}{1 + i\omega RC} \approx e^{-i\omega 2RC}$$

b)

a)

b)

a)

b)

CORRECTIONS FOR PULSE REVERBERATIONS AND PHASEFRONT ABERRATIONS IN ULTRASOUND IMAGING

PRIORITY CLAIM

Priority is claimed for this invention and application, corresponding application having been filed in U.S. on Apr. 5, 2002, No. 60/370,417.

BACKGROUND OF THE INVENTION

1. Field of the Invention

The present invention is directed to methods for estimating corrections for the image degradation produced in medical ultrasound images by pulse reverberations and phasefront aberrations of the ultrasound wave in the tissue. The method hence has applications to all situations were ultrasound imaging is used in medicine, and also other similar situations of ultrasound imaging.

2. Description of the Related Art

Spatial variations in the acoustic properties of tissues (mass density and compressibility) are the basis for ultrasound back scatter imaging of soft tissues. However, with large variations of the acoustic properties in complex structures of tissue, the following effects will degrade the images:

i) Interfaces between materials with large differences in acoustic properties can give so strong reflections of the ultrasound pulse that multiple reflections get large amplitudes. Such multiple reflections are termed pulse reverberations, and add a tail to the propagating ultrasound pulse, which shows as noise in the ultrasound image.* ii) Variations of the acoustic velocity within the complex tissue structures produce forward propagation aberrations of the acoustic wavefront, destroying the focusing of the beam mainlobe and increasing the beam sidelobes.*

The reduced focusing of the beam main lobe reduces the spatial resolution in the ultrasound imaging system. The pulse reverberations and the increase in beam side lobes by the phase front aberrations, introduce additive noise in the image, which reduces the ratio of the strongest to the weakest scatterer that can be detected in the neighborhood of each other, defined as the contrast resolution in the image. This noise is termed acoustic noise as it is produced by the transmitted ultrasound pulse itself. Increasing the transmitted pulse power will hence not improve the power ratio of the signal to the noise of this type, contrary to what is found with electronic receiver noise. It is therefore a challenge to reduce the image degrading effect of pulse reverberations and phase front aberrations in the body wall in many applications of medical ultrasound imaging.

The materials with largest differences in acoustic properties are muscles, fat, connective tissue, cartilage, bone, air, and the ultrasound transducer itself. The body wall often contains mixtures of such tissues, and body wall phase aberrations and pulse reverberations are therefore a major cause of image degradation found with non-invasive ultrasound imaging in many patients. Especially, due to the large reflection coefficient of the transducer array itself, pulse reverberations that involves at least one reflection from the transducer array often produce disturbing noise in the image.

With a two-dimensional transducer array, the effect of the phasefront aberrations can in many situations be reduced by adding corrective delays and gain factors to the signals for the individual array elements, in the following referred to as element signals. Such correction schemes have been presented by many researchers. In more complex situations of tissue mixtures, the phasefront aberrations can produce modifications of the pulse-form, that can be corrected by a filter for each of the element signals. Such correction filters give the most general correction method, and delay/amplitude corrections can be considered as a special case or an approximation of correction filters.

However, it is generally a problem to estimate the correction filters from the signals that is back scattered in typical imaging situations, as for example described in [2]. One major problem for such filter estimation is the noise produced by pulse reverberations in the body wall, especially the strong pulse reverberations that includes reflections from the ultrasound transducer itself. This invention presents new methods for reduction of the noise from pulse reverberations. This noise reduction is then used in conjunction with methods for estimation of correction filters, or the approximate amplitude and delay corrections, for the phase front aberrations of the forward propagating wave.

For better understanding of the aspects of the invention, we shall give a classification of the multiple scattering of the ultrasound in the tissue (pulse reverberations). The forward scattering is included in the spatially variable propagation velocity, and hence is included in the phase front aberrations. For visible noise from pulse reverberations, the first scatterer must be within the transmit beam, and the last scatterer must be within the receive beam. This requires in practice an odd number of scatterings for the reverberations to be visible, and as the pulse amplitude decreases for each scattering, it means that third order scattering is the major component of reverberation noise in the image. Such third order scattering is conveniently grouped into five classes, where the three first classes includes at least one reflection from the transducer array surface:

Class I: This class includes a first scattering from a first structure in front of the object (like in the body wall), followed by a reflection of this back scattered signal from the transducer array, followed by at least a third scattering from a second structure in front of the object. We call the range of these objects for Zone I with reference to FIG. 4 below.

Class II: This class includes a first scattering from a first structure in Zone I in front of the object (like in the body wall), followed by a reflection of this back scattered signal from the transducer array, followed by at least a third scattering from a second structure inside the object. We call the range of these second objects for Zone II with reference to FIG. 4 below.

Class III: This class includes a first scattering from a first target inside the object (Zone II of FIG. 4), followed by a reflection of this back scattered signal from the transducer array, followed by at least a third scattering from a second structure in front of the object (Zone i).

Class IV: This class includes a first scattering from a first stationary structure, followed by a second scattering from a second stationary tissue structure, followed by at least a third scattering from a third stationary structure.

Class V: All other types of pulse reverberations that are not described by Class I–IV.

We note that Class IV can include Class I–III reverberations, as the essential point about Class IV is that all scatterers are stationary, which allows special processing to reduce the reverberations as discussed below. $2^{nd}$ harmonic ultrasound imaging reduces Class I and Class II reverberations, because the $2^{nd}$ harmonic components in the outbound pulse is low as the wave passes the body wall, and the amplitude of the first scattering in Class I and Class II is very low. $2^{nd}$ harmonic components in the outbound pulse increases with propagation distance because the positive pressure swing in the pulse propagates with higher velocity than the negative pressure swing, due to the non-linear elasticity of the tissue. At the object depth, the $2^{nd}$ harmonic components in the outbound pulse has increased to sufficient energy for imaging, and the Class I and Class II reverberations are greatly reduced, which has introduced a wide spread use of the method.

However, some $2^{nd}$ harmonic components of the outbound pulse also exists within the body wall, and further reduction of the reverberation noise is in many situations necessary for adequate estimation of the phase aberration correction filters. Methods presented in this patent can be used for such reductions in the pulse reverberations, also in conjunction with other methods such as $2^{nd}$ harmonic imaging.

SUMMARY OF THE INVENTION

The present invention presents methods for corrections of pulse reverberations in the back scattered ultrasound signals for a two-dimensional ultrasound array, and uses such reduction in pulse reverberation noise in the element signals before estimation of corrections for phase front aberrations of the ultrasound wave, for improved estimation of such corrections. The reverberation corrected signals are corrected for phase aberrations before the final image processing, to produce images with reduced effect of pulse reverberations and phasefront aberrations given by the heterogenities in the tissue.

A first method addresses reduction of the pulse reverberations from very strong scatterers, like ribs and gas filled cavities. In this method, the active transmit aperture is adjusted to minimize the ultrasound energy of the transmit beam that hits these structures.

In a second method, the pulse reverberations of Class I and Class II, involving at least one reflection from the transducer array, is highly reduced. The received element signals from a $1^{st}$ transmit event of a first set of transmit voltage signals, are used to estimate $2^{nd}$ transmit voltage signals for the individual elements, through a filtering scheme. These $2^{nd}$ transmit voltage signals are applied on the individual elements in a $2^{nd}$ transmit event, and the received element signals from this $2^{nd}$ transmit event is combined with the received element signals from the $1^{st}$ transmit event for reduction of the pulse reverberations in the signals form the $1^{st}$ transmit event. In a modified scheme, the $2^{nd}$ transmit event includes transmission of both the $1^{st}$ voltage signals and the $2^{nd}$ voltage signals, for direct reduction of the pulse reverberations in the received element signals from the $2^{nd}$ transmit event.

In a third method, the pulse reverberations of Class III in the final beam signal is further reduced. The method is based on generating two test signals from a single transmit event using two receive beams, and convolving these signals with each other with further filtering to produce an estimate of the Class III reverberations in the final beam signal. Optionally the two test signals can be obtained through two transmit events. In a modified form, the method can also be used to reduce Class II reverberations in the final beam signal.

The three methods can favorably be combined, and also combined with harmonic imaging to further reduce the pulse reverberations within the body wall, and also other methods for reductions of pulse reverberations, for example as described in U.S. Pat. No. 6,485,423. The new methods are applied to the array element signals, and the reverberation corrected signals are used for estimation of corrections of phase front aberrations. Such reduction in the level of the pulse reverberations in the received signal can be necessary for estimation of the aberration corrections in difficult to image patients, for example as described in the above cited U.S. patent. One should note that the third method do not reduce the reverberations in the individual element signals, only in the final beam signal, and hence improve the estimation of phase aberration corrections when these are estimated through correlations with the beam reference signal, for example as described in the cited US patent.

In the design of the 2D arrays, the maximal width of the array elements is first limited by a beam forming requirement. This requirement can be formulated that the radiation opening angle of the elements covers the angular directions the beam is steered in. For wide angular steering of the beam in a phased array, this limits the element width around $\lambda/2$, where $\lambda$ is the wave length of the ultrasound in the tissue. For limited direction steering of the beam, as in switched arrays, the radiation opening angle of the elements must be sufficient for all elements to adequately irradiate the focus, and the element width is in practical systems~1–1.5$\lambda$. This gives a large number of elements for 2D arrays. To reduce the number of cables between the 2D array and the imaging instrument, methods are presented that use electronics close to the array that sums neighboring element signals into sub-aperture signals after delaying the element signals for the direction and focus steering of the beam, based on the assumption of constant propagation velocity in the tissue.

For the reverberation correction, a second, reverberation requirement on the element width is opposed, which is determined by that the reflection coefficient from the elements is well defined as in Eqs. (3,4). This requires that the size of the elements is so small that they have full sensitivity for the angular directions of the back scattered wave fronts, and is hence a similar requirement as that opposed by the beam forming.

In many situations, the reverberating structures within the body wall are layer-like structures with interfaces close to parallel to the skin surface. One can in such situations make use of sub-apertures for the attenuation of the body wall pulse reverberations, as for the beam steering, where one according to the invention uses mirrored listening to generate the correction signals, as described below. The pulse reverberation correction is then applied to sub-aperture signals. This allows reduction of number of wires between the array and the ultrasound instrument by providing sub-aperture generating electronics close to the array, and reduces the number of reverberation processing channels in the instrument.

The correlation length of the phase front aberrations is also generally larger than the beam-forming requirement on the element width. Both estimations of the aberration corrections and the corrections themselves are hence also favorably done on the sub-aperture signals. In many situations, the correlation length of the phase front aberrations is larger than for the wave fronts of the strong pulse reverberations. Hence, the sub-apertures for the phase aberration correction can in many cases be larger than the sub-apertures for the reverberation correction, and the invention in such cases proposes an increase in the sub-aperture size before estimation and application of the phase aberration correction.

The correction filters (or amplitude and delay approximations of the filters) for the phase-front aberrations can be estimated from artificially introduced point scatterers in the tissue, or from the signal from uniformly distributed, random scatterers that are δ-correlated in space, for example according to the methods described in U.S. Pat. No. 6,485,423. Ultrasound contrast agent is useful as scatterers in both these cases. The details of such methods are not considered in this patent.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be mad to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
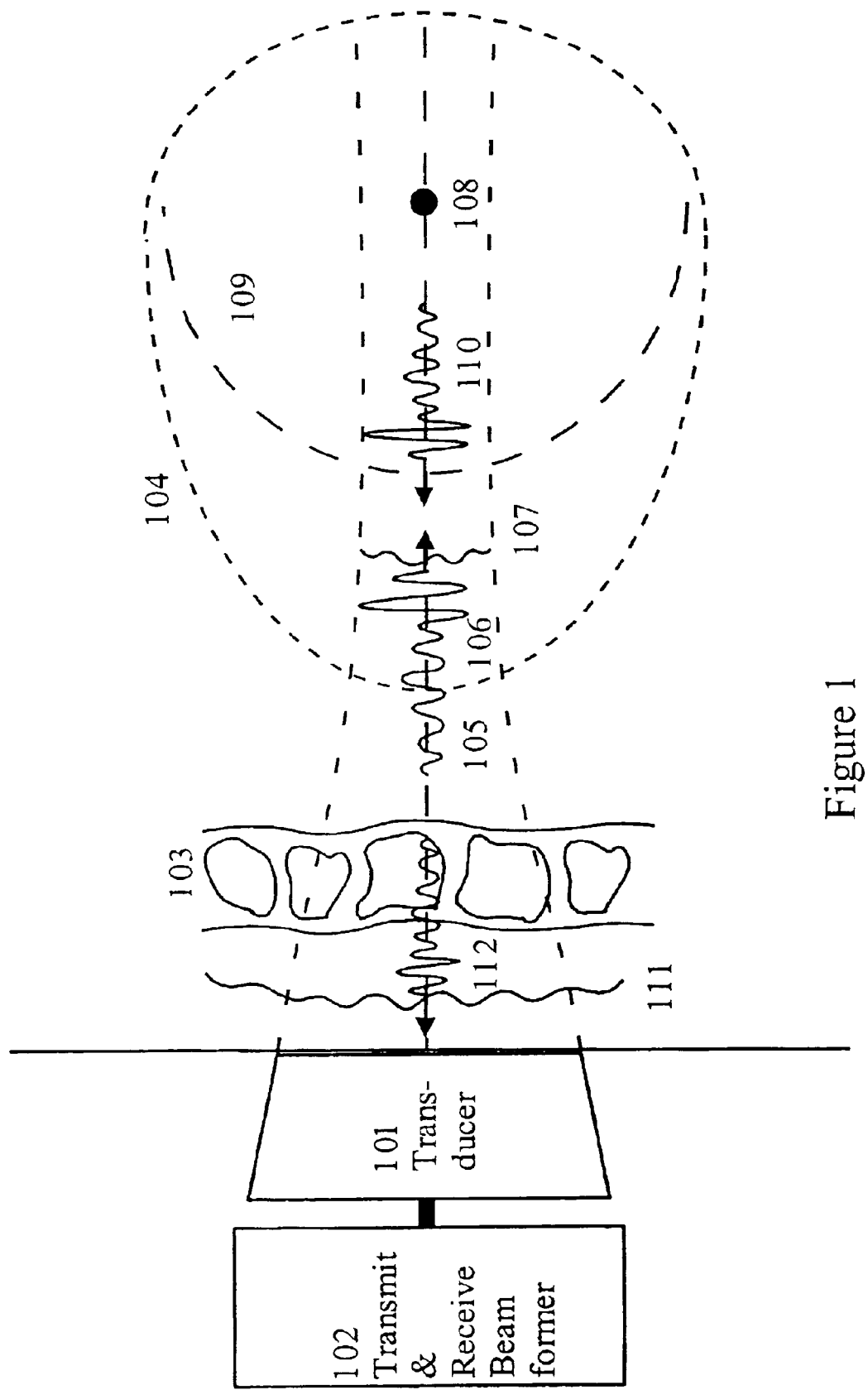
FIG. 1 shows a schematic illustration of pulse reverberations and phase front aberrations in the body wall.

FIG. 1 shows a typical measurement situation where an ultrasound transducer array (101) driven by a transmit beam former (102), transmits a pulsed and focused ultrasound beam through the body wall (103) towards an object (104) to be imaged. The body wall is a heterogeneous mixture of fat, muscles, and connective tissue with differences in acoustic velocity and characteristic impedance. Multiple reflections within the body wall and between structures in the body wall and the transducer, produces a reverberation tail (105) to the transmitted pulse (106) as it passes the wall. Similarly, the variations in the acoustic velocity produce aberrations of the phasefront (107) as the pulse passes the wall.

At reflection of the pulse from a point scatterer (108) within the object, a wave with spherical wave front (109) is reflected, with a second order temporal differentiation so that the essence of the band limited temporal variation of the pulse with reverberation tail is preserved (110). In passing the body wall on its path back to the transducer array, further aberrations of the pulse phasefront (111) occur, and additional reverberations of the pulse are found (112).

Figure 2:
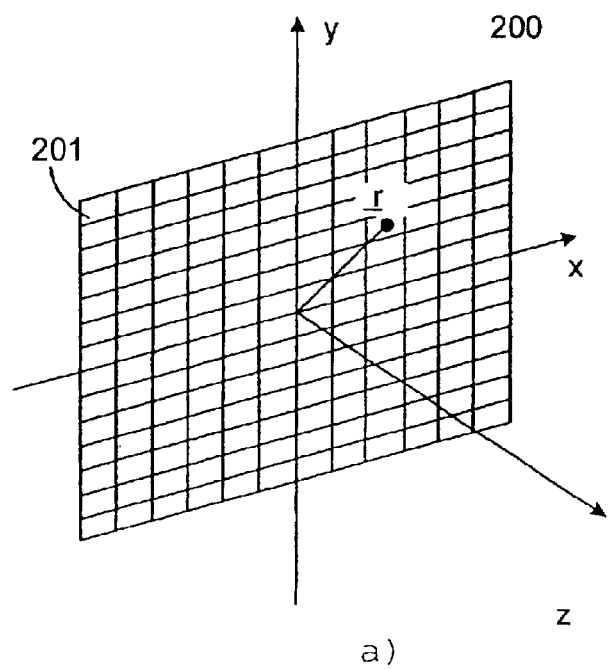
FIG. 2 shows schematically a two-dimensional ultrasound array that is used according to the invention for imaging with pulse reverberation and phase front aberration correction
Figure 2:
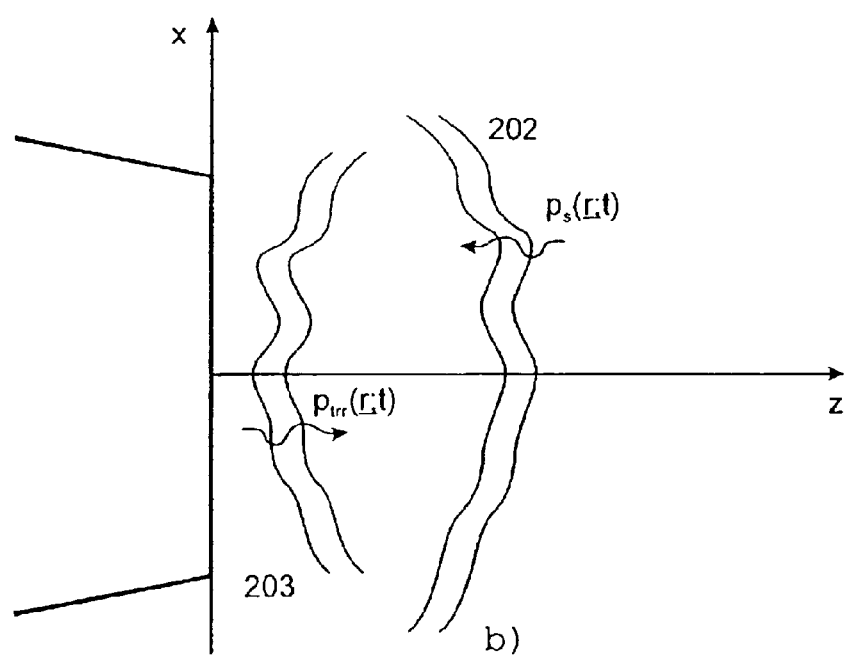
Figure 6:
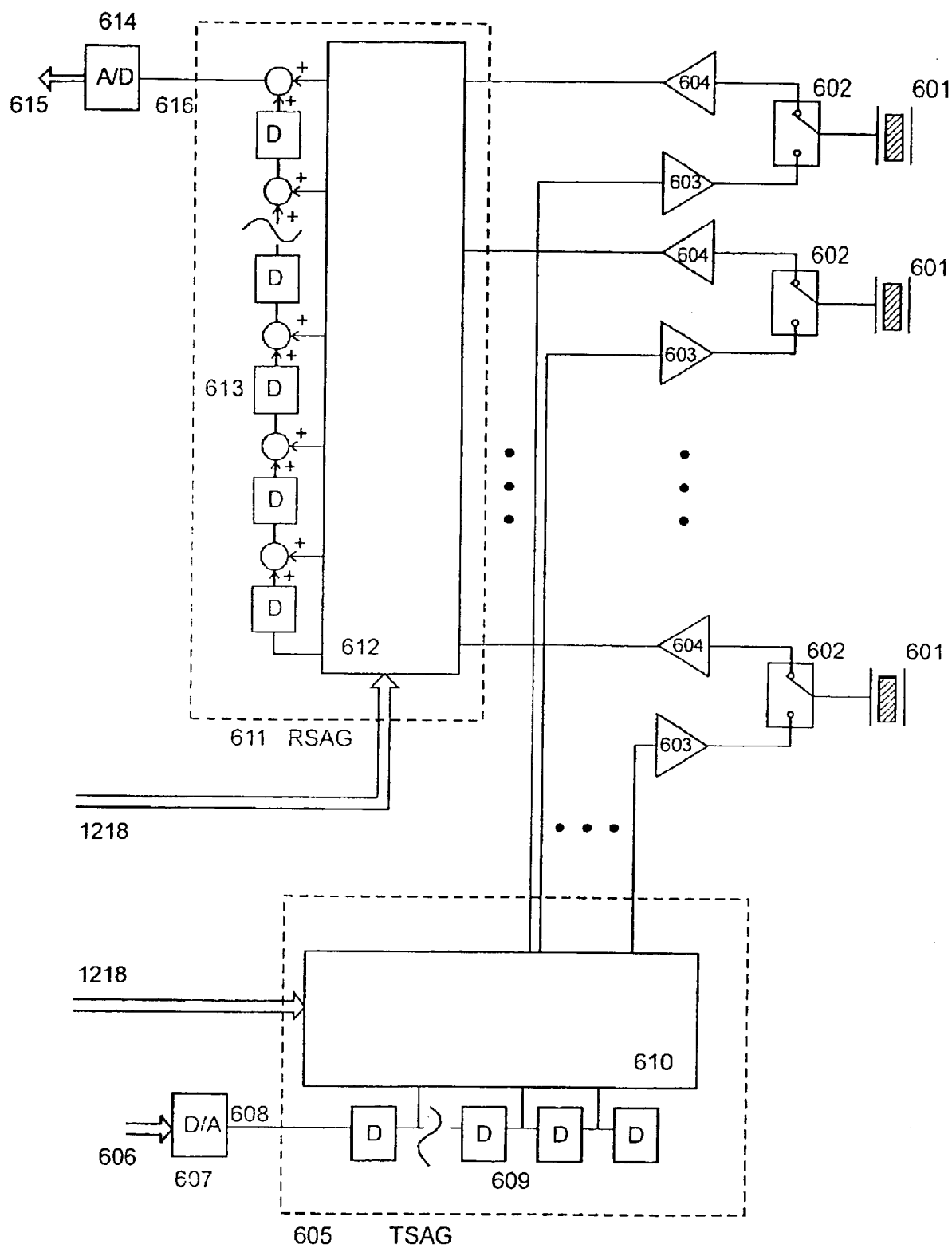
FIG. 6 shows block diagrams of systems for generation of transmit and receive sub apertures.

Methods of reducing pulse reverberation noise according to the invention, are now described with reference to the drawings. The methods require the use of a two-dimensional array, illustrated as 200 in FIG. 2. The array is composed of a set of individual elements 201 that are on the electrical terminals connected to individual transmitters and receivers, for example as illustrated in FIG. 6. The vector r denotes the center of each element, and the elements are assumed to be so small that they have full sensitivity for all directions of the incoming and transmitted wave fronts that occurs in the imaging process. Strongly reflecting structures in the body wall produces a back scattered wave $p_s(r;t)$ indicated as 202 in FIG. 2. This wave is reflected from the transducer array as $p_{trr}(r;t)$, indicated as 203 in FIG. 2. This reflected wave produces a third order reflected, pulse reverberation signal, and we shall in the following show how we can reduce this reverberation component in the received signal.

Figure 3:
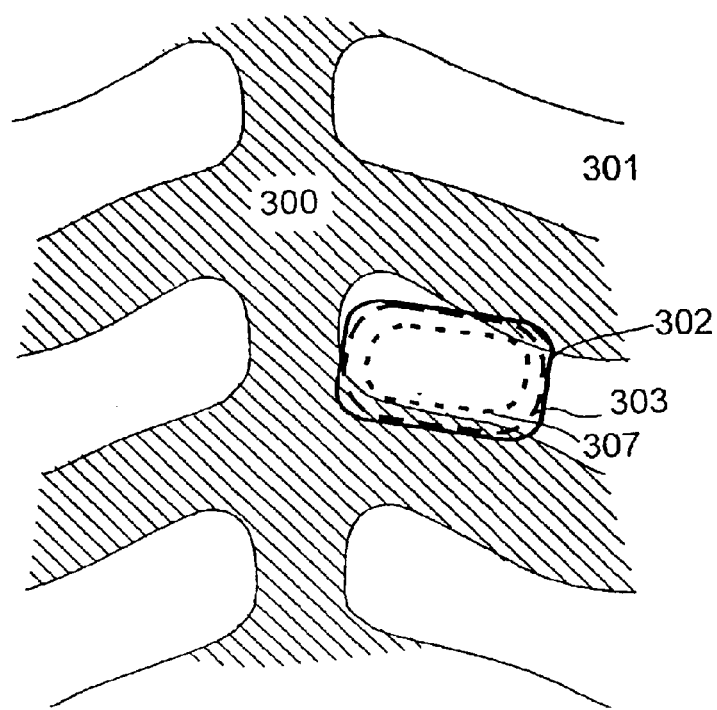
FIG. 3 shows how limited rib space introduces strong near-field reflections that produces strong pulse reverberations in the ultrasound image, and also how adjustment of the active transmit aperture can be used to reduce these pulse reverberations.
Figure 3:
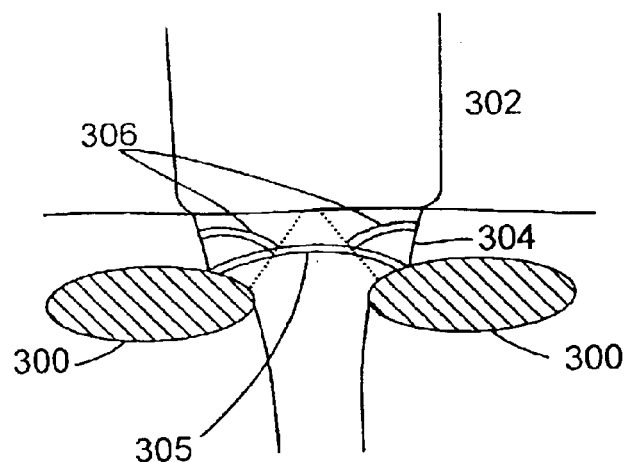

In the first aspect of the invention, the pulse reverberations are reduced by reducing irradiation of strongly reflecting structures in the body. For example, when imaging through the chest rib spaces or similar structures with strong reflections like bones or air-filled cavities, the size of the transmit aperture has strong influence on the amount of near field reverberations from the strong reflectors, as illustrated in FIG. 3. In this Figure by example, 300 illustrates chest ribs and 301 illustrates the intercostal spaces with a transducer array 302 positioned for imaging between the ribs. The part of the transducer array surface that is active as transmit aperture is illustrated as 303. In the particular projection in FIG. 3b, 304 illustrates the transmit beam, where we see that the pulse 305 hits the strongly reflecting rib and produces a strong, reflected waves 306. These waves will again be reflected from other strong reflectors, like the transducer surface, producing multiple reflections with large delay that shows up as reverberation noise in the image.

By reducing the transmit aperture to that indicated as 307, the transmit beam will pass the ribs, with a substantial reduction in the reflections from the ribs. Hence, to avoid the strong reflections from ribs and other structures, the present invention devices an adjustable transmit aperture of the 2D array, to generate transmit beams that minimizes the first reflections from such structures. The adjustment of the transmit aperture can either be done manually from a control organ on the instrument control panel, or through automatic adjustment.

In the manual adjustment one can for example systematically exclude outer elements of the array from the transmit aperture through adjustment of the control, while observing the resulting effect in the image. One can then select a transmit aperture that balances the reduction in reverberation noise and the reduction in image resolution introduced by the reduction in the transmit aperture.

In the automatic adjustment of the transmit aperture, several schemes of adjustment are possible of which we by example describe two schemes:

1. In the first scheme one transmits a first focused beam, using the whole array as transmit aperture, and observe the near field reflections on all element channels. Elements with particularly strong back scattering in the near field are then excluded from the transmit aperture that are used for the subsequent transmit pulses to scan a 2D image
2. In the second scheme, one transmits consecutive pulses and observes the near-field signal for all elements in the standard beam forming, and continuously increases the transmit aperture from a minimum until the near field signal amplitude of some elements reaches a defined threshold, and uses the aperture before the threshold is reached to do the imaging. Similarly, one can continuously decrease the transmit aperture from its maximum until the near field signal amplitude from all elements drops below a threshold.

Other schemes of automatic adjustment of the transmit aperture is also possible, particularly methods that also utilizes the direction of the reflected phase front, for example observed through correlations between the received signals of transducer elements or between the received signals of transducer elements and the sum of these signals.

For the second method of the invention, FIG. 4 illustrates again schematically a side view of the two-dimensional transducer array 401 in acoustic contact with the body wall 402 and the object 403 to be imaged. The transducer elements with center location at r are in a first transmit event driven with high voltage pulses $v_{tt}(r;t)$, where a typical example pulse is shown as 404 in FIG. 4. The temporal Fourier transform of this pulse is $V_{tt}(r;\omega)$ and takes values in a band around the center frequency $\omega_0$, where $\omega$ is the temporal angular frequency. In the following we use the temporal Fourier transform of the signals, denoted with capital letters, whenever it is convenient to simplify the expressions, while the temporal functions are denoted with lower case letters and used when one wants to illustrate the importance of the temporal variation. It is understood that the representations in the Fourier and temporal domains are equivalent for the description of the embodiments according to the invention.

Figure 4:
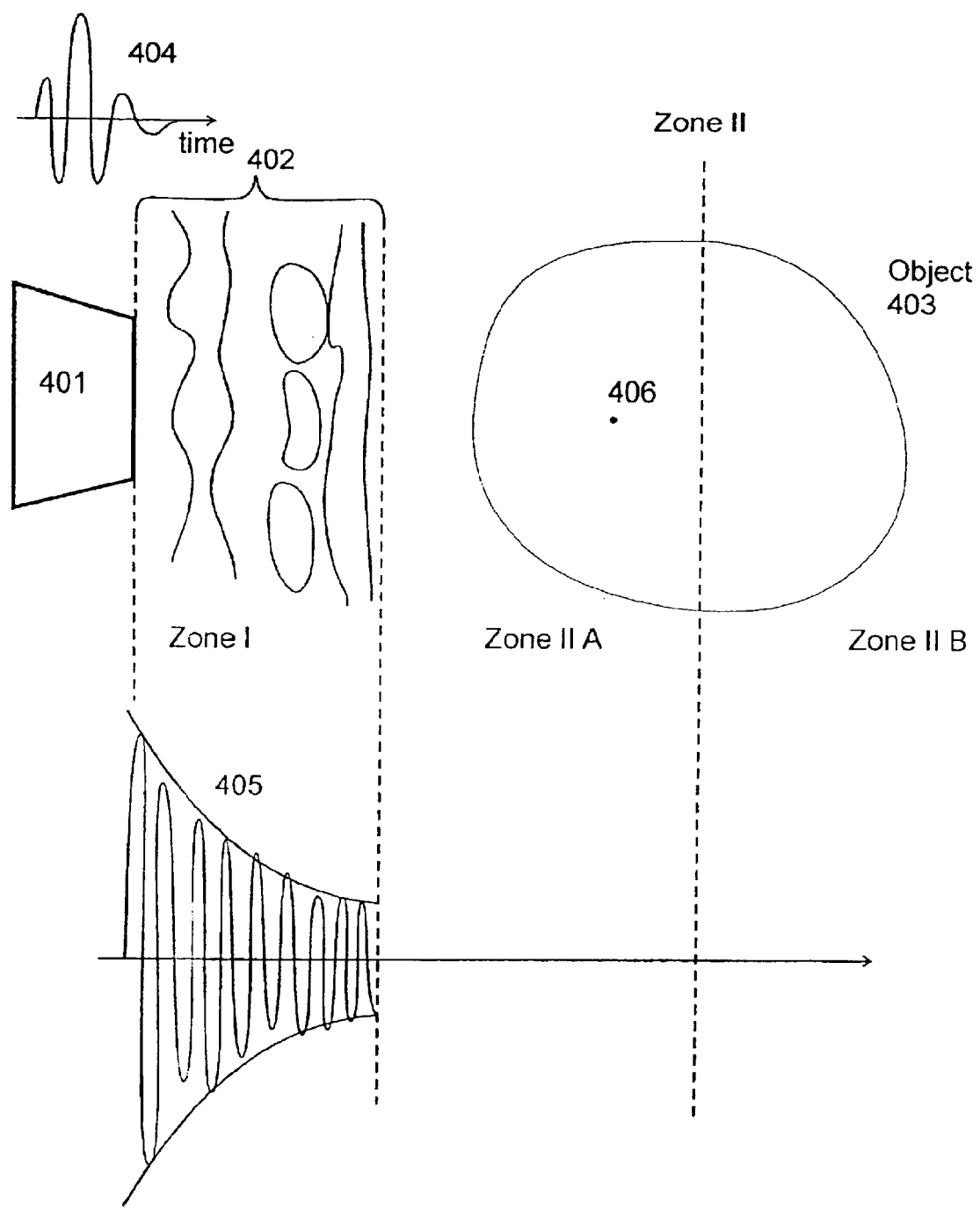
FIG. 4 shows division of the image region into zones with typical transmit and first period of an element receive signal.
Figure 5:
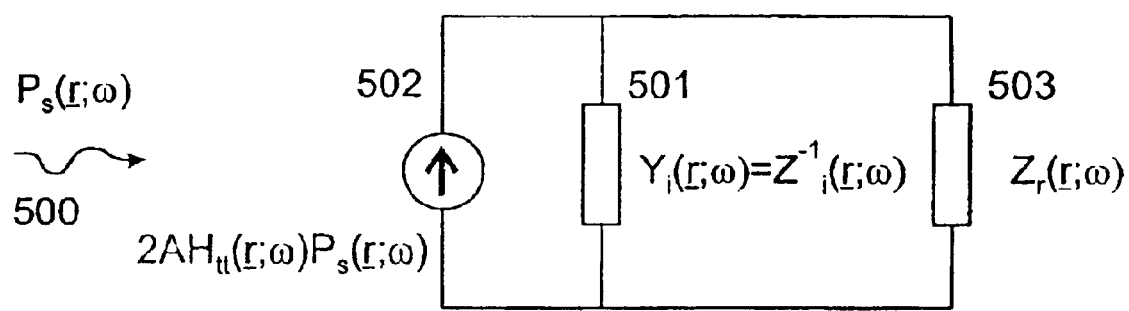
FIG. 5 shows a Norton equivalent representation of a receiving transducer element, and also how the back scattered signal is reflected from a sub-aperture.
Figure 5:
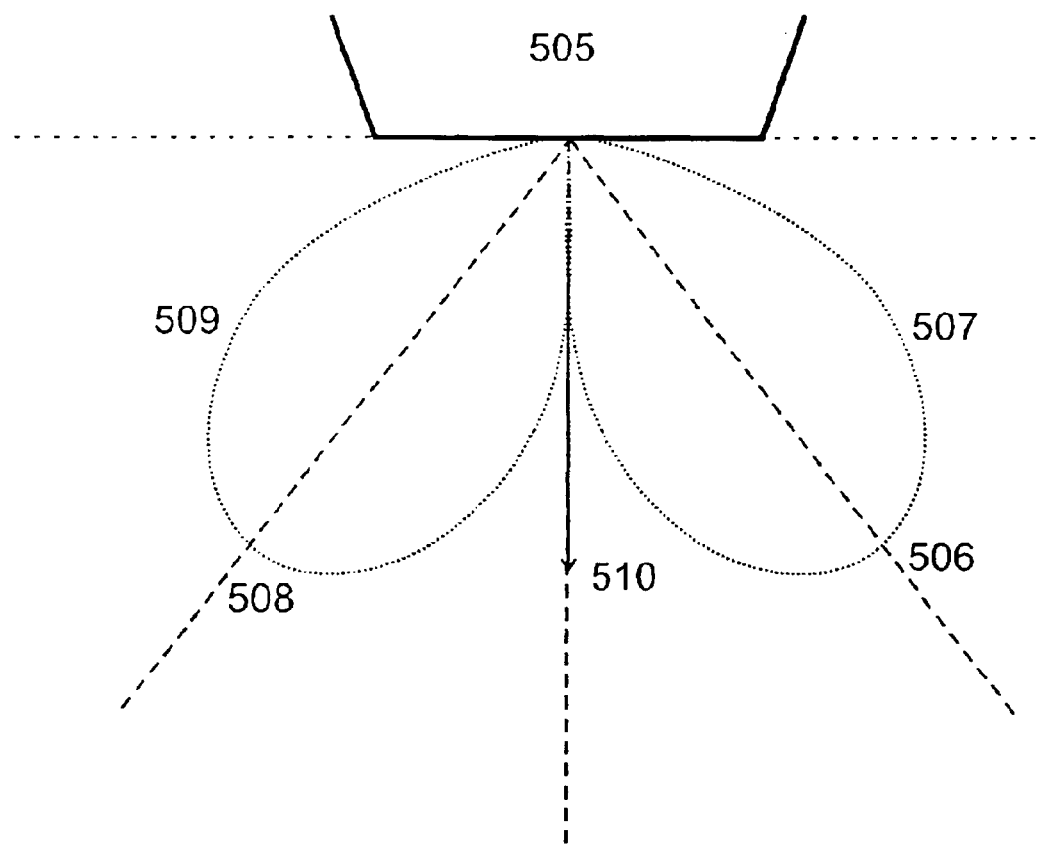

The incoming wave $p_s(r;t)$ gives a received signal $s_r(r;t)$ on the transducer element located at r, and illustrated by example as 405 in FIG. 4 for one array element. In the receive mode, each transducer element can be represented by a Norton equivalent circuit as shown in FIG. 5a. This circuit has a source admittance $Y_t(r;\omega)=Z_t(r;\omega)^{-1}$ shown as 501, where $Z_t(r;\omega)$ is the source impedance, also found as the transducer element input impedance in the transmit situation. The current source 502 of the Norton equivalent is given as $2AH_{tt}(r;\omega)P_s(r;\omega)$, where $P_s(r;\omega)$ is the scattered, incoming wave indicated as 500, A is the area of the transducer element, and $2AH_{tt}(r;\omega)$ is the pressure to short circuit current transfer function of the transducer element. Due to reciprocity, $H_{tt}(r;\omega)$ is the transmit transfer function from the drive voltage at the electric transducer element electrodes to the vibration velocity at the element surface, as for example defined in Eq. (6) below.

The received signal for the array element with center location at r and terminated with a receiver impedance $Z_r(r;\omega)$, shown as 503 in FIG. 5a, is $$S_r(r;\omega) = H_{rt}(r;\omega)AH_{tt}(r;\omega)2P_s(r;\omega) \tag{1}$$

$$H_{rt}(r;\omega) = \frac{Z_r(r;\omega)Z_i(r;\omega)}{Z_r(r;\omega)+Z_i(r;\omega)}$$

The incoming wave $P_s(r;\omega)$ onto the array elements can now be estimated from the received element signal by inverting Eq. (1). Since the measured, received signal contains noise, full inversion will amplify the noise for frequencies where $H_{rt}(r;\omega)=AH_{rt}(r;\omega)H_{tt}(r;\omega)$ has low amplitude. It is therefore an advantage to use a Wiener type of inversion given as $$P_s(r;\omega) = W_{rt}(r;\omega)S_r(r;\omega) \tag{2}$$

$$W_{rt}(r;\omega) = \frac{1}{2H_{rt}(r;\omega)} \frac{1}{1+MR/|H_{rt}(r;\omega)|^2 SR}$$

where MR is the maximal value of $|H_{rt}(r;\omega)|$ with respect to $\omega$ in the center of the band, and SR is a signal to noise ratio parameter. When $|H_{rt}(r;\omega)|^2 >> MR/SR$ we get $W_{rt}(r;\omega)\sim 1/2H_{rt}(r;\omega)$, i.e. an inverse filter, and when $|H_{rt}(r;\omega)|^2 << MR/SR$ we get $W_{rt}(r;\omega)\sim H_{rt}(r;\omega)^*SR/2MR$, i.e. its amplitude goes to zero with $H_{rt}(r;\omega)$ to attenuate the noise. The incoming wave gives a reflected wave as $$P_{trr}(r;\omega)=R(r;\omega)P_s(r;\omega) \tag{3}$$

where $R(r;\omega)$ is the pressure reflection coefficient at the surface of the array element located at r. The subscript trr refers to transducer reverberations, i.e. the multiple scattering that involves at least one reflection from the transducer, and $p_{trr}(r;t)$ is illustrated as 203 in FIG. 2.

Assuming that the array elements are so small that their receive sensitivity is not reduced for the actual angular directions of the incoming wave fronts (ref. the reverberation requirement on the element width described above) we can express the reflection coefficient as $$R(r;\omega)=R_s(r;\omega)+2Z_L AH_{rt}(r;\omega)H_{tt}^2(r;\omega) \tag{4}$$

where $R_s(r;\omega)$ is the reflection coefficient for shorted electric terminals of the element at r, and the last term is the modification found with a receive voltage on the terminals. $Z_L$ is the characteristic impedance of the tissue. The vibration velocity of the transducer reverberation reflected wave at the surface of the array element at location r, is $$U_{trr}(r;\omega) = \frac{P_{trr}(r;\omega)}{Z_L} = \frac{1}{Z_L}R(r;\omega)W_{rt}(r;\omega)S_r(r;\omega) \tag{5}$$

Such a vibration velocity of the element surface can also be obtained by driving the transducer element with the voltage $v_{trr}(r;t)$, which is found from the definition of the transmit transfer function $H_{tt}(r;\omega)$ as $$U_{trr}(r;\omega)=H_{tt}(r;\omega)V_{trr}(r;\omega) \tag{6}$$

which gives $$V_{trr}(r;\omega) = H_{trr}(r;\omega)S_r(r;\omega) \tag{7}$$

$$H_{trr}(r;\omega) = \frac{R(r;\omega)W_{rt}(r;\omega)}{Z_L H_{tt}(r;\omega)(1+MRR/|H_{tt}(r;\omega)|^2 SRR)}$$

where $MT=\max|H_{tt}(r;\omega)|$ with respect to $\omega$ in the actual pulse band, and ST is a signal to noise ratio parameter.

Hence, $H_{trr}(r;\omega)$ includes a Wiener type inverse filter of both $H_{tt}(r;\omega)$ and $H_{rt}(r;\omega)$ discussed above.

In some instruments, a current receiver is used (i.e. $Z_L(r;\omega)=0$). The received signal current is then related to the incoming pressure wave according to the Norton Equivalent in FIG. 5a as $$S_r(r;\omega)=2H_{rt}(r;\omega)P_s(r;\omega) \quad H_{rt}(r;\omega)=AH_{tt}(r;\omega) \qquad (8)$$

We get the reflected wave as $P_{trr}(r;\omega)=R_s(r;\omega)P_s(r;\omega)$, as the electric terminals now are essentially shorted, and using a Wiener type of inversion of Eq. (8) for $P_s(r;\omega)$ we get the reflected wave as $$P_{trr}(r;\omega)=R_s(r;\omega)W_{rt}(r;\omega)S_r(r;\omega) \qquad (9)$$

where $W_{rt}(r;\omega)$ is given in Eq. (2) with $H_{rt}(r;\omega)$ given in Eq. (8). The vibration velocity of this wave is $U_{trr}(r;\omega)=P_{trr}(r;\omega)/Z_L$. To transmit a wave that is equal to this reflected wave, we must apply a drive voltage on the element electric terminals as given in Eq. (6). Hence, combining Eq. (6) and (9) gives the required drive voltage $V_{trr}(r;\omega)$ to transmit the same wave as the reflected wave $$V_{trr}(r;\omega) = H_{trr}(r;\omega)S_r(r;\omega) \qquad (10)$$

$$H_{trr}(r;\omega) = \frac{R_s(r;\omega)W_{rt}(r;\omega)}{Z_L H_{tt}(r;\omega)(1 + MRR/|H_{tt}(r;\omega)|^2 SRR)}$$

Hence, by recording the received signal $s_r(r;t)$, illustrated as 405 in FIG. 4, after the pulse transmission by the high voltage pulse $v_{tt}(r;t)$ (404), one can from Eqs. (7) or (10) find a drive voltage $v_{trr}(r;t)$ that when applied as a transmit voltage on the electric element terminals, produces a transmitted wave similar to that reflected from the transducer from the incoming scattered wave from the first pulse $v_{tt}(r;t)$. One hence can synthesize the reflected wave from the transducer.

With complex scattering structures in the body wall, it can be necessary to have small transducer elements with wide opening angle of sensitivity, to reshape the reflected wave $p_{trr}(r;t)$ that produces visible reverberation noise through transmitting the voltage $v_{tt}(r;t)$ on each element. However, as stated in the summary, the strongly reverberating structures within the body wall are in many situations layer-like structures with interfaces close to parallel to the skin surface. To generate the reflected components from the transducer in the direction of the receiver beam that produces strong reverberation noise in the image, one can in such situations make use of sub-apertures for the attenuation of the body wall pulse reverberations.

For further description of the use of sub-apertures with reverberation attenuation, we refer to FIG. 5b which shows the side view of an example array 505. The direction of the imaging transmit and receive beams are shown as 506 with 507 indicating the directional beam profile of the sub-apertures for the transmit and receive imaging beams. To find the wave that is reflected from the transducer array surface in the direction 506 of the receive beam, and hence produces strong reverberation noise in the receive signals, one must use a second listening sub-aperture direction 508 that is the mirror direction of 506 around the transducer surface normal 510. The directional receive profile of this second listening sub-aperture is indicated as 509. The incoming wave components arriving around the direction 508 will hence be reflected from the transducer surface in the direction 506 of the imaging receive beam. With a curved front face of the array, the direction of the listening sub-aperture beam is also obtained as the mirror arund the sub-aperture center normal of the receive sub-aperture beam as obtained through geometric ray approximations according to known principles.

We denote the receive signals from the second listening sub-aperture direction 508 for $s_{rb}(r;t)$, where r denotes the location of the sub-aperture. This signal is then filtered according to Eqs. (7) or (10) to produce the $v_{trr}(r;t)$ that is transmitted with a sub-aperture direction 506 to emulate the field reflected from the transducer in the direction 506 of the imaging receive beam, that produces strong reverberation noise in the sub-aperture receive signals $s_r(r;t)$, with sub-aperture receive beam direction 506. The pulse reverberation correction is then applied to sub-aperture signals, which reduces the number of reverberation processing channels in the instrument. With the sub-aperture generation circuits located at the array, the number of wires connecting the array assembly and the instrument is also reduced.

An example of such a sub-aperture generation is shown in FIG. 6, where 601 indicates a set of neighboring transducer elements, each dimensioned according to the requirement for beam forming described above. Each of these elements are connected to one of a set of transmit/receive switches 602, that selects the connection to transmit amplifiers 603 in transmit mode, and receive amplifiers 604 in receive mode.

For transmission, FIG. 6 shows by way of example, that the transmit amplifiers 603 are driven by a transmit sub-aperture generator 605 that takes the output 608 of the D/A converter 607 as its input. The input 606 to the D/A converter comes from other processing structures in the imaging instrument, for example as described in FIGS. 8 and 10b. The analog signal 608 is fed through a ladder of delay sections 609, where the cross point switch 610 selects signals with adequate delays of the transmit signal for the different transducer elements in the sub-aperture, for the direction and focus steering of the sub-aperture beam. The switch 610 is set up with the bus 1218, which also sets up variable transmit amplitude for the different elements of the sub-aperture, for amplitude appodization of the transmit beam.

Figure 8A:
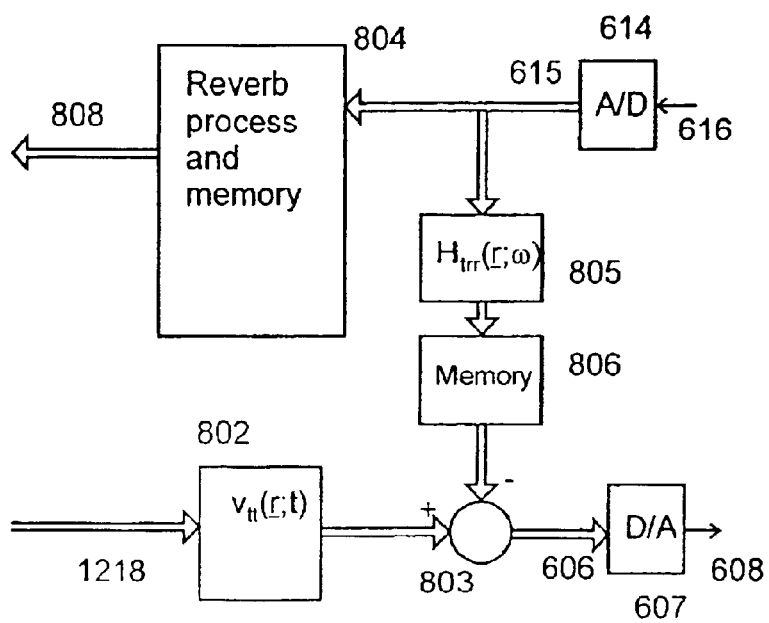
FIGS. 8a, 8b and 8c show block diagrams for processing systems for correction of transducer pulse reverberations.
Figure 8B:
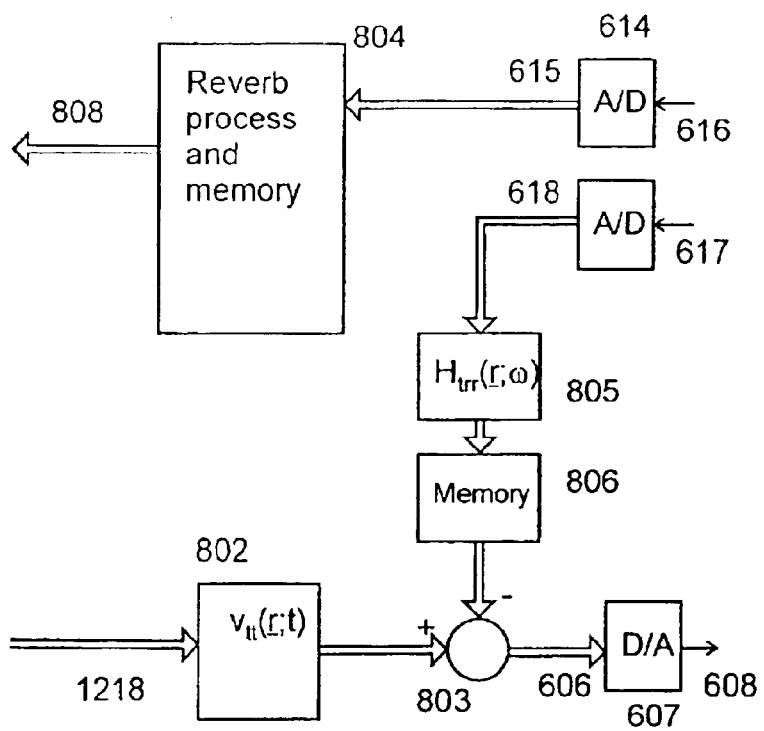

The outputs of the individual receiver amplifiers in the set 604 are fed to a sub-aperture receive generator 611, where the signals are first fed to a cross-point switch 612 that injects the signals at adequate points of the receive delay network 613 where the output 616 is fed to a receive A/D converter 614 which feeds its digital output 615 to further processing, for example as described in FIG. 8. The receive sub-aperture generator 611 hence provides direction and focus steering of the receive sub-aperture beam. The selection of the delay settings of the cross point switch 612 is done via the control bus 1218. For reverberation processing of sub-aperture signals, it can in some situations be necessary to receive in parallel signals from sub-apertures with different directions, for example as discussed in relation to FIG. 8b. In this case, the output of the receiver amplifiers 604 can be connected to two receive sub-aperture generators in parallel with separate cross-point switches that are set up differently, and separate delay networks and A/D converters as outputs.

The sub-aperture receive and transmit delays are calculated for each element according to standard methods for direction and focus steering under the assumption of constant propagation velocity in the tissue. It is also useful to do amplitude appodization of the element signals in the sub-aperture transmit and receive generators to reduce sidelobes in the beam, where the amplitude weighting must be calculated in relation to subsequent beam forming for the whole active transmit and receive apertures, as discussed in relation to FIG. 12. The amplitude appodization can by example in the circuit in FIG. 6 be set up in the transmit (610) and receive (612) cross point switches.

Figure 7:
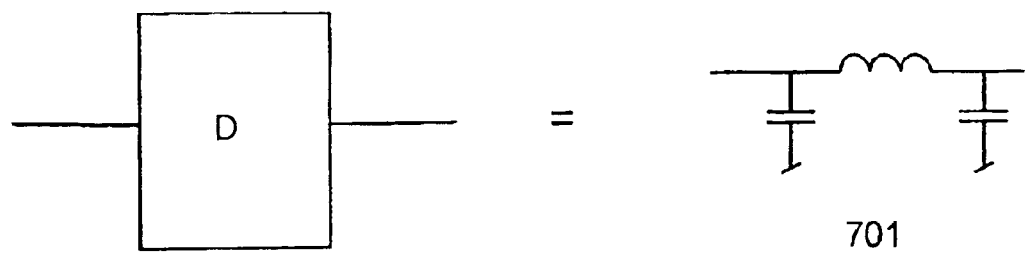
FIG. 7 shows examples of delay units for the transmit and receive sub-aperture generators.
Figure 7:
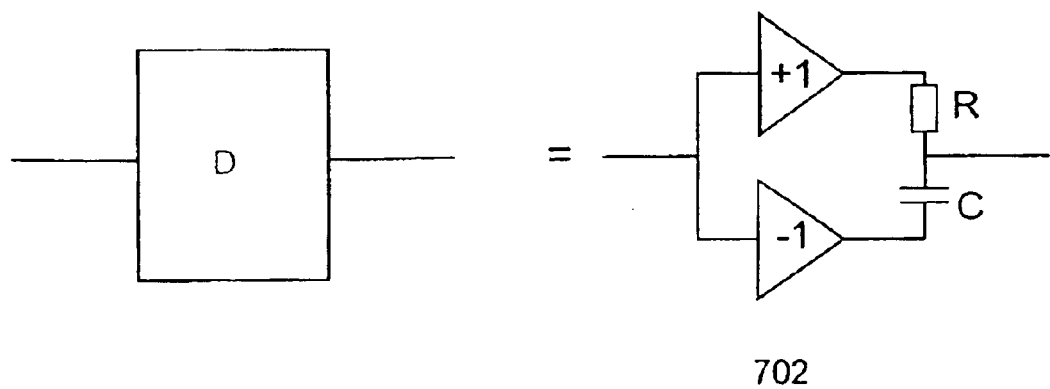

In the implementation of FIG. 6, both the transmit (609) and receive (613) delays are implemented with analog techniques, for example as illustrated in FIG. 7 by the passive L/C ladder 701 in FIG. 7a. FIG. 7b shows as 702 a delay cell implemented as a differential amplifier with an RC output load impedance where the voltage transfer function approximates a delay 2RC per delay cell.

The use of analog sub-aperture delays allows the use of only one A/D converter 614 and one D/A converter 607 per sub-aperture generator. In a completely integrated design, one can use a digital implementation of the delays, that requires one A/D converter per individual receiver amplifier 604 and one D/A converter per individual transmit amplifier 603. However, due to the large number of elements in the 2D arrays, one can use less number of bits (e.g. 8–10) in the A/D converters than for the A/D converter at the output of the sub-aperture receive generator 611, which requires 10–12 bits resolution.

The reduction of pulse reverberations in the received array element or sub-aperture signals on the basis of Eqs. (7) or (10), is now described with reference to FIG. 8. We note that r denotes the center of the array element for single element processing and the center of the sub-aperture for sub-aperture processing. The Figure describes processing for one array element or one sub-aperture signal centered at r, and are copied for all active elements/sub-apertures in the array. When subapertures are used in the processing, the receive A/D converter 614 of the sub-aperture in FIG. 6, is taken as the receive input 615 to the processing in FIG. 8. Similarly, the transmit output of the processing in FIG. 8 is 606 and the transmit D/A converter 607 of FIG. 6. With processing for each individual element (i.e. no formation of sub-apertures), 608 drives a single element, while 616/617 is the received signal from that element.

In the processing scheme, a first transmit pulse $v_{tt}(r;t)$ is produced by a signal generator 802 in a $1^{st}$ transmit event. This pulse can be a simple oscillation, for example 3 half cycles long, or can be a pulse that is modified to compensate for phase front aberrations in the transmitted beam. The simplest aberration compensation modification is a delay and amplitude correction, which can be implemented as a triggering delay and gain adjustment of the pulse generator. Modifications of the pulse form to compensate for pulse destruction, can be implemented by a FIR filter as in FIG. 10b. The filtering of FIG. 10b can also be carried through in SW by an aberration correction estimation processor, and the result stored in a memory device 802 to be triggered by a transmit event marker on the bus 1218.

A first processing scheme useful for small sub-apertures or single element processing is illustrated in FIG. 8a. In the $1^{st}$ transmit event, triggered by a signal on the bus 1218, the output of the memory 806 is set to zero, and the pulse $v_{tt}(r;t)$ generated by 802 is transmitted via summation unit 803 to the transmit D/A converter 607 to generate the imaging transmit beam. The received array element signal $s_r(r;t)$ from the first transmit event is recorded and stored for the whole depth of the image in the Reverberation Processing unit 804. With no sub-aperture generator, the signal $s_r(r;t)$ is in the block 805 filtered with $H_{rrr}(r;\omega)$ from Eqs. (7) or (10), depending on the receiver amplifier, for an initial interval of the received signal, illustrated as 405 in FIG. 4, to produce $v_{trr}(r;t)$ which is stored in the memory device 806. Depending on the speed of processing, the unit 805 could operate on the $s_r(r;t)$ signal from many array elements and store the result in unit 806 for each element. The filtering 805 could also conveniently be carried through in SW in a reverberation estimation processor, and the results stored for each r in a memory unit 806.

The initial period of the received signal that produces the stored $v_{trr}(r;t)$, is typically the period that covers the signal from the body wall up to the whole signal period in front of the interesting part of the object. The image range where this signal stems from, is referred to as Zone I in FIG. 4. It is the period in front of the object region where the reflected wave from the array elements produce the most visible reverberation noise in the image.

In a $2^{nd}$ transmit event, the output of the signal generator 802 of FIG. 8a is set to zero and the signal $v_{trr}(r;t)$ is replayed from the memory 806 via the summation circuit 803 to the transmit D/A converter 607 to be transmitted for the array element located at r. The transducer elements are hence in this transmission driven with the voltage $-v_{trr}(r;t)$.

The received signal $s_{trr}(r;t)$ from the $2^{nd}$ transmit event is for the whole receive period recorded in the Reverberation Processing unit 804, where it is combined with the signal stored from the first transmit event to a transducer reverberation corrected signal $s_c(r;t)$ given as $$s_c(r;t)=s_r(r;t)+s_{trr}(r;t) \qquad (11)$$

Figure 12:
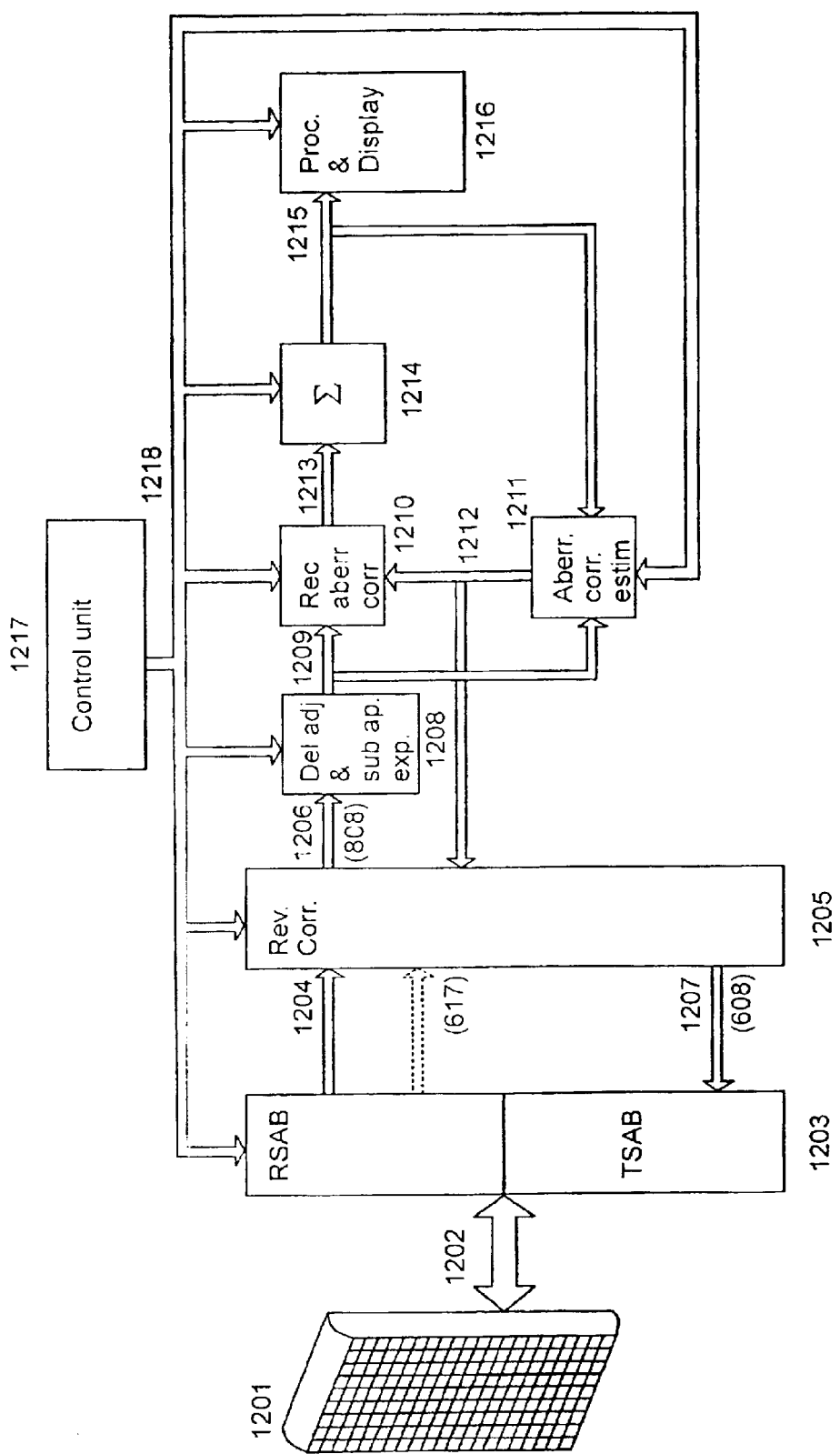
FIG. 12 shows a block diagram of a processing system for corrections of pulse reverberations and phase front aberrations in an ultrasound imaging system.

This corrected signal is transferred further to the other parts of the imaging instrument via the receive bus 808, for further processing to generate the ultrasound image, for example as described in relation to FIG. 12.

With directional sub-aperture generation, the block diagram of the processing is modified to that in FIG. 8b. In this situation, two receive sub-aperture generators are run in parallel, set up with the two receive directions 506 and 508 shown in FIG. 5b. The directions of the transmit sub-apertures are the same as for the receive imaging beam 506. The signals $s_r(r;t)$ are then for the different sub-aperture positions r, the outputs of the first receive sub-aperture generators, introduced as 616 in FIG. 8b, that are set up for the receive image beam direction 506. The second receive sub-aperture generators with direction 508 produce the second receive signals $s_{rb}(r;t)$, introduced as 617 in FIG. 8b. In this scheme, $s_{rb}(r;t)$ are filtered in 805 by $H_{rrr}(r;\omega)$ from Eqs. (7) or (10), depending on the receiver amplifier, to produce $v_{trr}(r;t)$ which is stored in the memory device 806. In the second transmit event, the transmit sub-aperture generators maintains the direction 506 of the image transmit beam and $-v_{trr}(r;t)$ is transmitted in this direction. The back scattered signal $s_{trr}(r;t)$ from this transmit event is then received with the receive sub-aperture direction along the imaging receive beam 506, and for each sub-aperture combined with $s_r(r;t)$ to $s_c(r;t)$ according to Eq. (11).

The receiver is blocked for the whole transmit period of $-v_{trr}(r;t)$ (Zone I of FIG. 4), and hence the signal $s_c(r;t)$ only exists for Zone II, beyond Zone I of FIG. 4. Zone IIA in FIG. 4 has the same range as Zone I, and shows the range of pulse reverberation noise involving at least one scattering from the transducer, and where both the first and the second tissue scatterer is within Zone I. This produces the Class I reverberation noise described above.

When one of the two tissue scatterers involved in the reverberation noise, is in Zone II, $s_{trr}(r;t)$ will only represent that part of the reverberation noise where the first tissue scatterer is within Zone I with the last tissue scatterer in Zone II, referred to as Class II reverberations above. Hence, Class I and Class II reverberation noise is represented with the signal $s_{trr}(r;t)$, and Eq. (11) hence theoretically has the potential to cancel all reverberation noise of Class I and Class II.

Class III reverberations will not be cancelled with this method, but Class III reverberations in the image beam can be attenuated with the method related to Eqs. (29,30) below. In case of a moving object, like the heart, blood or contrast agent bubbles, Class IV reverberations can be attenuated by transmitting multiple pulses in each beam direction, and high pass filtering the received signal for each depth and beam direction along the pulse number coordinate.

Figure 8C:
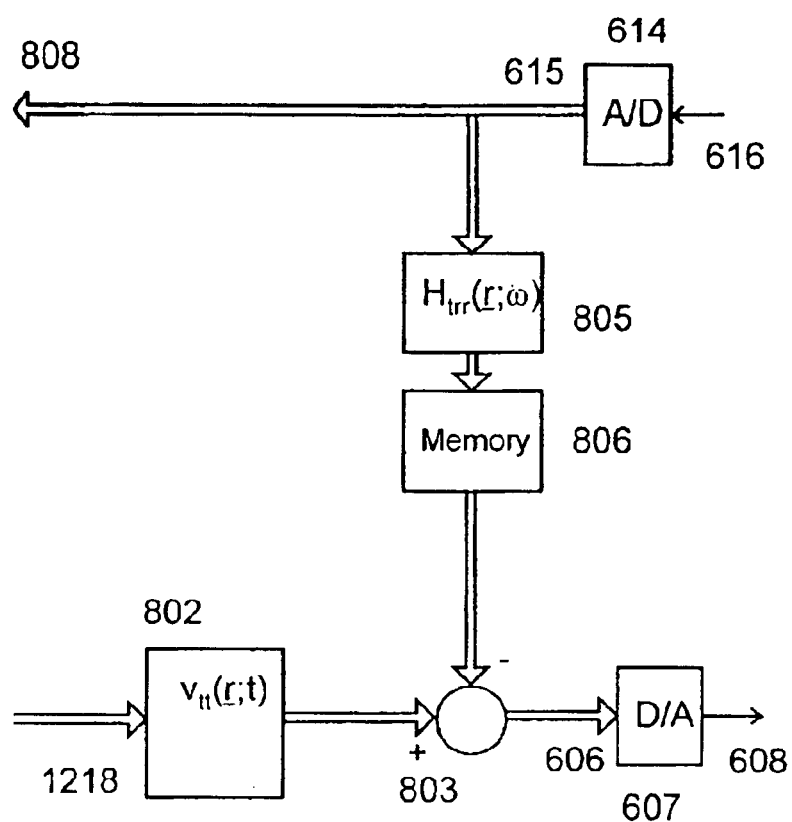

The second scheme of transducer reverberation correction is illustrated in FIG. 8c, which shows as in FIG. 8a the same receive A/D converter and transmit D/A converter interfacing to the sub-aperture generators shown in FIG. 6.

In this $2^{nd}$ scheme, one transmits in a $1^{st}$ transmit event, the first high voltage pulse $v_{tt}(r;t)$ triggered by a signal on the bus 1218 that triggers the first transmit signal generator 802, while the output of the memory 806 is set to zero. With sub-aperture generation, the transmit sub-aperture directions are set up as the imaging transmit beam direction 506, and the receive sub-aperture direction is set up as the mirror direction 508 of the imaging transmit and receive beams. This produces the received (sub-aperture) element signals $s_{rb}(r;t)$ that is filtered to $v_{trr}(r;t)$ in the unit 805 and stored in the unit 806 for a sufficiently long period as under the first scheme (Covering Zone I in FIG. 4). In a $2^{nd}$ transmit event, the signal generator 802 is triggered in synchrony with read out of the memory 806 to give the following drive signal on the element electrodes $$v_{2tt}(r;t) = v_{tt}(r;t) - v_{trr}(r;t) \tag{12}$$

Transmit and receive sub-apertures are now set up in the direction of the imaging beam. The multiple scattering from the first pulse $v_{tt}(r,t)$ in Eq. (12) that involves at least one reflection from the transducer, will then for the near-field arrive at the transducer elements at the same time as the transmission of $-v_{trr}(r,t)$. The transmitter amplifier must in this situation have the same source impedance as the receiver input impedance, to get the same reflections from the transducer during the second transmission as during the reception from the first transmission. The open circuit transmitter voltage must then be modified so that the $-v_{trr}(r,t)$ is found at the transducer element electrodes, which is done according to well known procedures. With a current receiver amplifier with zero input impedance, this implies a transmitter that voltage drives the transducer with $-v_{trr}(r,t)$.

The out-bound wave from the transducer is in this period the sum of that transmitted by $-v_{trr}(r,t)$, $-p_{trr}(r,t)$, and that reflected from the transducer of the first order near-field scattered signal from $v_{tt}(r,t)$, $p_{trr}(r,t)$, giving zero net reflected outbound wave in the direction of the receive beam for the period of receiving signal from Zone I of FIG. 3. The method hence synthesizes zero reflection coefficient from the transducer array in the direction of the receive beam, for the period where signal from Zone I is received.

The received signal from this 2nd transmit event is therefore automatically corrected for Class I and Class II pulse reverberations. The signal from the $2^{nd}$ transmission is then transferred directly from the receiver A/D converter over the receiver bus 808, to other parts of the imaging instrument, for further processing to generate the ultrasound image, for example as described in relation to FIG. 12. Hence, for the scheme in FIG. 8c, the reverberation correction occurs directly at the transducer element which allows omission of the Reverberation Processing unit 804 that simplifies the processing.

In the linear approximation of wave propagation in the tissue, all aspects of the propagation is contained in the Green's function. The linear approximation is fully adequate for the low amplitude back scattered signal, and is also a good approximation for the propagation part of the harmonic components in the transmitted pulse found with non-linear propagation. In the temporal frequency domain, we describe the Green's function as $G(r,r_f;\omega)$, and it gives the field at the field-point r from a unit point source located at the source-point $r_f$ and radiating continuous, time harmonic waves with temporal angular frequency $\omega$.

In the following analysis we relate the Green's function for heterogeneous tissue mixtures to the free-space Green's function $G_h(r-r_f;\omega)$ for the homogeneous material with the constant propagation velocity, c, assumed in the instrument for direction and focus steering of the beam, as $$G(r,r_f;\omega) = S(r,r_f;\omega)G_h(r-r_f;\omega) \tag{13}$$

where $$G_h(r - r_f; \omega) = \frac{e^{-ik|r-r_f|}}{4\pi|r-r_f|} \quad k = \omega/c$$

$S(r,r_f;\omega)$ is called the frequency dependent phase-amplitude screen for a scatterer at location $r_f$. It represents the deviation in the wave propagation from that in the assumed homogeneous medium given by both the phase aberrations and also the pulse reverberations.

Absorption in the tissue makes k complex, i.e. $k = k_r - ik_d$, where $k_r$ is the real part of k and $-k_d$ is the imaginary part of k. In this case we have $$G_h(r - r_f; \omega) = L(r - r_f; \omega) \frac{e^{-ik_r|r-r_f|}}{4\pi|r-r_f|} \tag{14}$$

$$L(r - r_f; \omega) = e^{-k_d|r-r_f|}$$

where L is the loss function determined by the dissipation factor $k_d$. The wave propagation phase velocity is now $c = \omega/k_r$.

When there is no power absorption in the tissue, the wave equation has the property that time reversal of the acoustic field is a solution to the wave equation, also with spatial variations in the propagation velocity [1]. Hence, if we measure the field $p(r;t)$ from a point source at $r_f$ for all points r in space up to the time T, the wave $p(r;T-t)$ will converge towards $r_f$ again. However, we are only able to measure the field at the transducer surface which represents the forward propagating wave, while multiple pulse scattering found as wave field within the tissue, is not observed. If we retransmit with inverse time the measured wave at the transducer surface, we will produce a wave that is focused at $r_f$ and compensated for the forward propagation aberrations of the wave front due to spatial variations in propagation velocity, where the focusing is limited by the diffraction produced by the limited aperture of the transducer. As we with this approach are not time reversing the reverberation field in the tissue, the retransmitted wave will produce pulse reverberations, and methods as the ones described above are therefore necessary to reduce the pulse reverberations.

Figure 9:
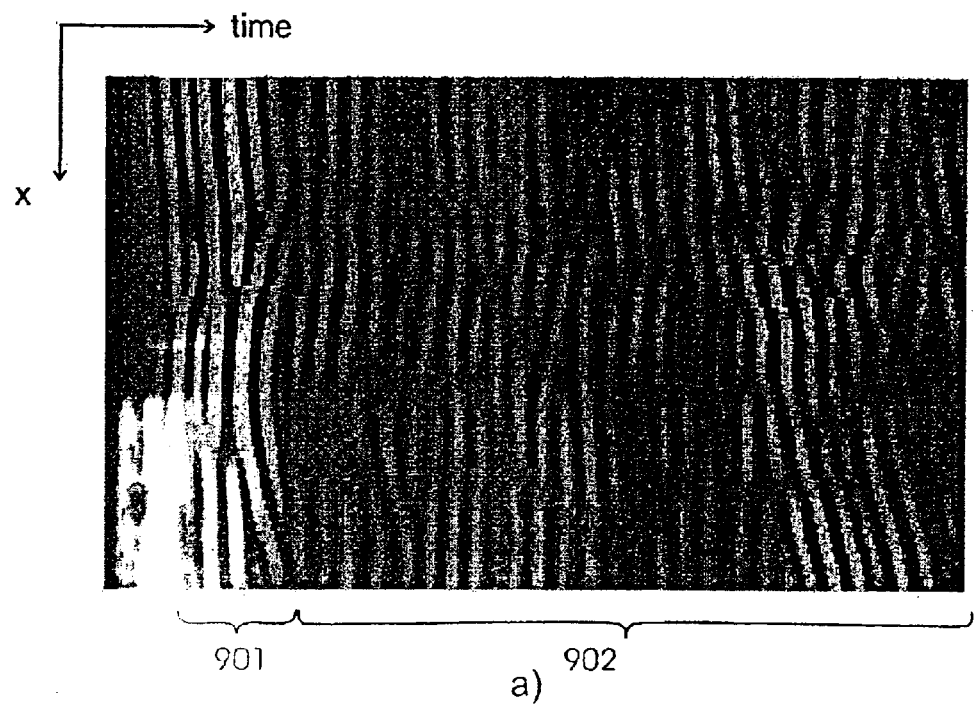
FIG. 9 shows the receive phase front from a point source after corrections for the curvature of the assumed constant propagation velocity, together with beam profiles obtained with various phase aberration corrections, compared to the beam profiles obtained with constant propagation velocity.
Figure 9:
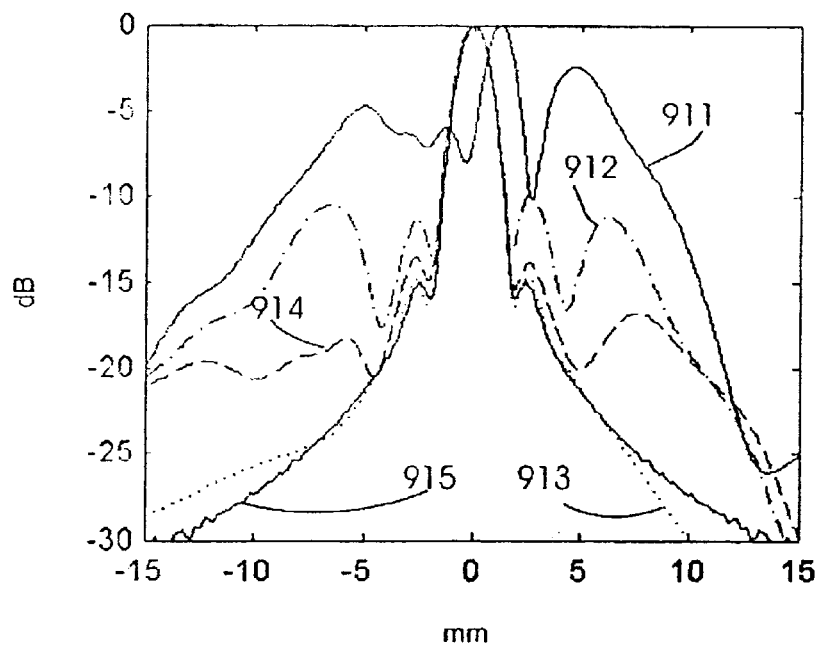

FIG. 9a shows a gray scale plot of a selected portion of $s(r,r_f;\omega)$, the inverse Fourier transform of $S(r,r_f;\omega)$, for r on the array surface. The x-axis is the coordinate in the azimuth direction of the array, where we are showing $s(r,r_f;\tau)$ for a fixed coordinate y in the elevation direction. $s(r,r_f;\tau)$ represents the received signal from a point source located at $r_f$, where the curvature of the wave front due to propagation with the constant propagation velocity assumed for beam forming in the instrument, has been removed. The first part of s(r,r$_f$;τ), shown as 901 in FIG. 9*a*, represents modifications of the pulse wave front produced by the forward propagation of the pulse from the point source at r$_f$. The pulse reverberations are represented by the tail of s(r,r$_f$;τ), shown as 902 in FIG. 9*a*, and are hence found with large phase angles of S(r,r$_f$;ω). By the processing in FIG. 8, the tail of s(r,r$_f$;τ) is highly attenuated in the received signal, to produce a ^s(r,r$_f$;ω) that mainly contains the main, first part that stems from the forward propagation of the wave, denoted as 901. This part has undergone phase front aberrations due to spatial variations in the propagation velocity.

The time reversed transmission of the forward propagating wave is equivalent to setting up the transmit beam former for focusing onto r$_f$ under the assumption of a constant propagation velocity c in the tissue, and then filtering the transmit pulses at the element location r on the transducer surface with the phase conjugation filter $$H_{abc}(r,r_f;\omega) = \hat{S}^*(r,r_f;\omega) \tag{15}$$

where * denotes complex conjugation. In many practical situations, one can approximate the frequency dependent phase-amplitude screen by an amplitude, a$_s$, and delay, τ$_s$, screen, i.e.

$$\hat{S}(r,r_f;\omega) \approx a_s(r,r_f) e^{-i\omega\tau_s(r,r_f)} \tag{16}$$

which gives the following correction filters $$H_{abc}(r,r_f;\omega) \approx a_s(r,r_f) e^{i\omega\tau_s(r,r_f)} \tag{17}$$

When the real phase front (111) is not ideally spherical due to aberrations, the standard beam former produces a less than ideal focus of the receiver beam. This is illustrated by the focal beam profile 911 of FIG. 9*b*. Using corrective delays on the element signals, one is able to produce an improved focal beam profile as 912 in the Figure. For comparison, the Figure also shows the focal beam profile 915 that is obtained for wave propagation in water. Further improvements in the beam profile is obtained by additional amplitude corrections of the received element signals according to Eqs. (17), shown as 914, while full filtering of the element signals according to Eq. (15) gives the best corrected beam profile, shown as 913.

Spatially homogeneous power absorption in the tissue produces a frequency dependent attenuation of the wave, that is independent of space. Corrections for spatial variations in the propagation velocity can then still be done with the correction filters of Eqs. (15,17). Spatial variations of the power absorption in the tissue is not compensated for by Eqs. (15,17).

Figure 10:
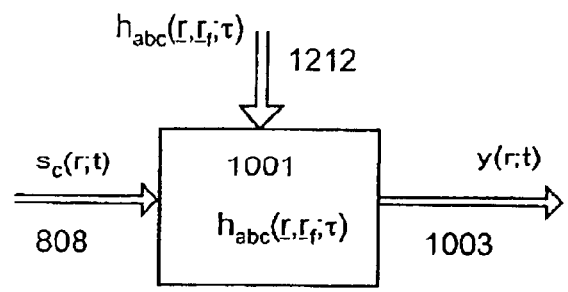
FIG. 10 shows example filtering of the receive and transmit signals for full corrections of the phase front aberrations of the receive and transmit beams.
Figure 10:
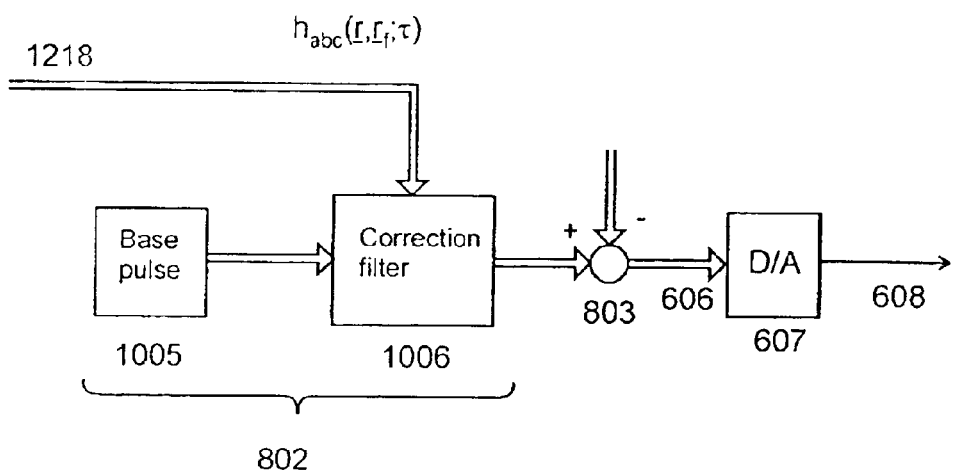

The filter corrections can be carried through in FIR filters, where FIG. 10*a* shows an example of a receive filter unit with the impulse response h$_{abc}$(r,r$_f$;τ) as the inverse Fourier transform of H$_{abc}$(r,r$_f$;ω), implemented in the block 1001. The filter unit takes as its input the reverberation corrected receiver signals given as 808 in FIG. 8, and produces receive element (or sub-aperture element) signals 1003 that are corrected for the phase front aberrations of the heterogeneous variation of the propagation velocity. We note that these signals are also corrected for the pulse reverberations by the processing shown in FIG. 8. The filter impulse response (filter coefficients) is set via the connection 1212 that is presented by a phasefront aberration correction estimation unit described below.

The transmitted pulse with corrections for phase front aberrations, can for each element be generated by a filter with the impulse response h$_{abc}$(r,r$_f$;τ), as illustrated in FIG. 10*b*. This unit contains a FIR implementation of the correction filter in the block 1006. The filter takes as its input a base pulse from 1005 that would be used for beam forming in the assumption of constant propagation velocity in the tissue. The output of the digital filter is then fed via the summation 803 to transmit D/A converter 607 in FIGS. 6 and 8. Alternatively, the output of filter 1006 could be stored in a memory device 802 of FIG. 8. In this situation the filtering of the pulse in 1006 with h$_{abc}$(r,r$_f$;τ) can also be done in SW and the result stored in 802. The pure delay part of the transmit correction can be implemented as a delayed read-out of the memory 802, where the details of such designs and methods are obvious to one skilled in the art.

The estimation of correction filters, or filters approximated as delay and amplitude corrections, can be done from the element signals from artificially introduced point scatterers, or from the element signals from a uniform, random distribution of scatterers with δ-correlation in the spatial coordinate, as for example described in U.S. Pat. No. 6,485,423. Essential in such estimation schemes is that the signal received a time delay t after the pulse transmission must origin at object scatterers located at the same depth r=ct/2 from the transducer element, where c is the constant propagation velocity of ultrasound in the tissue used in the beam former. With large reverberation noise, much of the signal arriving at the transducer element at the time delay t after the pulse transmission, originates at other scatterer locations and can hence not be used for estimation of the correction filters. One must therefore strongly attenuate reverberation noise in the element signals, before adequate estimation of the phase aberration corrections can be done.

The present invention therefore devices a scheme of improved ultrasound imaging, where the pulse reverberation noise in the received element signals (or sub-aperture signals) is first reduced according to the methods described above. The reverberation corrected element signals (or sub-aperture signals) are then used for estimation of correction filters for phase front aberrations produced by the forward wave propagation. A block diagram for such a scheme is shown in FIG. 12.

In this Figure, the two-dimensional array is schematically illustrated by the block 1201. With sub-aperture reduction of the number of correction channels, the array is first connected via 1202 to a receive and transmit sub-aperture generator unit 1203, which for example operates according to the principles shown in FIGS. 6 and 7. The output of this unit is a reduced number of sub-aperture receive signals 1204 (616/615 of FIG. 8) that is fed to a reverberation correction unit 1205, for example operating by one of the processing schemes shown in FIG. 8. When the reverberation correction processing is done directly on the element signals without forming sub-apertures, the unit 1203 is omitted and the array element signals are connected directly to 1205. The reverberation correction unit 1205 produces an output 1206 (808 of FIG. 8) of reverberation corrected receive sub-aperture signals (or element signals), and also transmit signals 1207 (606/608 of FIG. 8), i.e. v$_{tt}$(r;t), v$_{trr}$(r;t), or v$_{tt}$(r;t)−v$_{trr}$(r;t), as described in relation to FIG. 8.

The reverberation corrected receive sub-aperture signals 1206 is fed to a unit 1208 that delay adjusts the sub-aperture signals (or element signals) for direction and focus steering of the beam based on the assumption of constant propagation velocity in the tissue. The unit also can perform amplitude apodization of the sub-aperture signals combined with the amplitude apodization in unit 1203, according to standard methods of beam forming. When the correlation length of the phase front aberrations is much longer than the dimension of the sub-apertures generated in the unit 1203, one can optionally expand the dimension of the sub-apertures at the output of unit 1208 by adding delay adjusted signals from neighboring sub-apertures, and hence reduce the number of signals for phase aberration estimation and correction. The dimension of these larger sub-apertures are still less than the correlation length of the phase-aberration disturbances along the array.

The output signals 1209 of the unit 1208 is then fed both to a receive correction unit 1210 for the phase front aberrations, and an estimation unit 1211 of the aberration correction filters (or approximate delay and amplitude corrections). The estimation can be done by correlation or parameter estimation techniques, as commented above. The output 1212 of the estimation unit 1211 is the correction filter characteristics, for example the impulse responses or approximate delay and amplitude corrections, to the receive aberration correction unit 1210, and also to the unit 1205 for corrections of the phase front aberrations in the transmit beam as discussed in relation to FIGS. 8 and 10b. The receive phase aberration correction in unit 1210 can conveniently be done by a FIR filter for each sub-aperture, as illustrated in FIG. 10a, or by approximate delay and amplitude corrections according to standard methods.

The aberration corrected sub-aperture signals 1213, is then added in the summation unit 1214 to form the received signal for the whole beam. Optionally, the unit 1214 can introduce sets of added delay adjustments of the sub-aperture signals before summation to produce parallel receive beam signals from several neighboring beam directions in parallel. The beam signals 1215 are then fed to the unit 1216 for further processing of the signals to ultrasound images, and display of the images, according to known methods. The whole system is controlled by the unit 1217 that transfers control signals to all units over the control bus 1218.

The transfer functions and reflection coefficients of the array elements can due to manufacturing inaccuracies, vary between transducer arrays and also between individual array elements for the same array. The invention presents a solution to this problem, where experimental measurements of transfer functions, $H_{rrr}(r;\omega)$, or impulse responses, $h_{rrr}(r;\tau)$, of the reverberation filters in block 805 of FIG. 8, are stored in a memory device in the array or array connector assemblies for all array elements. At the plug-in of the array connector to the instrument, or at start-up of the scanning, the reverberation filter responses of the individual elements in the array can be read into the device 805 of FIG. 8.

We note that the reverberations of Class III are not reduced by the methods described above. To further analyze this phenomenon, we start with the transmitted ultrasound beam $P_t(r_1,r_t;\omega)$ given as $$P_t(r_1,r_t;\omega)=P_t(\omega)ikH_t(r_1,r_t;\omega) \quad (18)$$

where $k=\omega/c$, $P_t(\omega)$ is the Fourier transform of the transmitted pressure pulse, and $H_t(r_1,r_t;\omega)$ is the spatial frequency response of the aberration corrected transmitted beam focused at $r_t$, at the field point $r_1$ as $$H_1(r,r_t;\omega) = \int_{S_t} d^2r_0 2G(r_0,r_1;\omega)e^{-i\omega\tau_1(r_0,r_1)}H_{abc}(r_0,r_t;\omega) \quad (19)$$

$$c\tau_1(r_0,r_t) = r_1 - |r_0 - r_t|$$

where $S_t$ is the array transmit surface, and $r_0$ is the integration coordinate over the array surface. $\tau_1(r_0,r_t)$ is the beam forming delay for focusing the transmit beam onto $r_t$, calculated on the assumption of constant propagation velocity c in the tissue. The first order back scattered wave at the field point $r_2$ is $$P_s(r_2;\omega) = -k^2 P_t(\omega)ik\int_{V_f} d^3r_1 G(r_2,r_1;\omega)H_t(r_1,r_t;\omega)v(r_1) \quad (20)$$

where $v(r_1)$ is the back scattering density in the tissue, and $V_f$ is a region of scatterers in the object (Zone II), for example located around the focus of the receive beam. The back-scattered wave produces the following reflected wave from the array at the field point $r_3$ $$P_{trr}(r_3;\omega) = ik\int_{S_R} d^2r_2 2G(r_3,r_2;\omega)R(r_2;\omega)P_s(r_2;\omega) \quad (21)$$

where $S_R$ is the array reflecting surface. This wave is again scattered at the location $r_3$ and produces the received reverberation signal of Class III for elements at r as $$s_{trr3}(r;\omega) = -k^2 H_{rt}(r;\omega)\int_{V_n} d^3r_3 2G(r,r_3;\omega)P_{trr}(r_3;\omega)v(r_3) \quad (22)$$

where $H_{rt}(r;\omega)=AH_{rt}(r;\omega)H_{tt}(r;\omega)$ is given above, and $V_n$ is the near-field region of scatterers in Zone I in front of the object that together with the scattering from $V_f$ in the object produces visible reverberation noise of Class III. Introducing the expression for $P_{trr}(r_3;\omega)$ and $P_s(r_2;\omega)$ from Eqs. (21,20) we can express the received class III reverberation element signal as $$S_{trr3}(r;\omega) = k^4 P_r(r;\omega)(ik)^2 \int_{V_f \times V_n} d^3r_j d^3r_3 2G(r,r_3;\omega)v(r_3)H_{rev}(r_3,r_1;\omega)H_t(r_1,r_t;\omega)v(r_1) \quad (23)$$

$$H_{rev}(r_3,r_1;\omega) = \int_{S_R} d^2r_2 2G(r_3,r_2;\omega)R(r_2;\omega)G(r_2,r_1;\omega) \quad (23)$$

where $P_r(r;\omega)=H_{rt}(r;\omega)P_t(\omega)$ is the received pulse for the element at r. We should note that by letting $V_f$ and $V_n$ denote the appropriate regions, Eq. (23) gives a formula for reverberations of both Class I ($V_f=V_n$ in front of the object), Class II ($r_1$ is in $V_n$ and $r_3$ is in $V_f$), and Class III ($r_1$ is in $V_f$ and $r_3$ is in $V_n$).

Beam forming this signal over the array with receive beam focus at $r_f$, we get the following received reverberation beam signal for Class III reverberations as $$Y_{trr3}(\omega) = \int_{S_r} d^2r_4 e^{-i\omega\tau_r(r_4,r_f)}H_{abc}(r_4,r_f;\omega)S_{trr3}(r_4;\omega) \quad (24)$$

$$c\tau_r(r_4,r_f) = r_f - |r_4 - r_f|$$

where $r_4$ is the integration coordinate over the receive array surface $S_r$, and $\tau_r(r_4,r_f)$ is the beam forming delays for the receiver beam, calculated on the assumption of constant propagation velocity c in the tissue. Inserting Eq. (23) we can express the Class III beam reverberation signal as $$Y_{trr3}(\omega) = k^4 P_r(\omega)(ik)^2 \int_{V_f \times V_n} d^3 r_1 d^3 r_3 H_r(\underline{r}_3, \underline{r}_f; \omega) v(\underline{r}_3) H_{rev}(\underline{r}_3, \underline{r}_1; \omega) H_t(\underline{r}_1, \underline{r}_t; \omega) v(\underline{r}_1) \qquad (25)$$

$$H_r(\underline{r}_3, \underline{r}_f; \omega) = \int_{S_t} d^2 r_4 2G(\underline{r}_4, \underline{r}_3; \omega) e^{-i\omega \tau_r(\underline{r}_4, \underline{r}_f)} H_{abc}(\underline{r}_4, \underline{r}_f; \omega)$$

where $H_r(r_3,r_f;\omega)$ is the aberration corrected receive beam at the field point $r_3$ when the beam is focused at $r_f$, and we have assumed that $P_r(r;\omega) \approx P_r(\omega)$ for all elements. If the approximation can not be done, $P_r(r;\omega)$ must be left under the integral of $H_r$ in Eq. (25), which will not affect the essence of this invention.

Reciprocity makes the Green's function symmetric, i.e. $G(r_1,r_2;\omega) = G(r_2,r_1;\omega)$. We hence see from Eq. (23) that $H_{rev}(r_3,r_1;\omega) = H_{rev}(r_1,r_3;\omega)$. Hence, if the transmit and receive beams are equal, i.e. $H_r(r_3,r_f;\omega) = H_t(r_3,r_f;\omega)$, we can exchange the integration over $r_1$ and $r_3$ and we see that the beam reverberation signal of Class III is equal to the beam reverberation signal of Class II.

Further analysis of Eq. (25) provides new methods of corrections for the Class III reverberations. We modify $H_{rev}(r_3,r_1;\omega)$ from Eq. (23) as $$H_{rev}(\underline{r}_3, \underline{r}_1; \omega) = R(\omega) 2G(0, \underline{r}_1; \omega) H_{re3}(\underline{r}_3, \underline{r}_1; \omega) \qquad (26)$$

$$H_{re3}(\underline{r}_3, \underline{r}_1; \omega) = \int_{S_R} d^2 r_2 2G(\underline{r}_3, \underline{r}_2; \omega) \frac{G(\underline{r}_2, \underline{r}_1; \omega)}{G(\underline{0}, \underline{r}_1; \omega)} \frac{R(\underline{r}_2; \omega)}{R(\omega)}$$

where $R(\omega)$ is an average reflection coefficient for all transducer elements. The expression for $H_{re3}(r_3,r_1;\omega)$ is further modified as $$H_{re3}(\underline{r}_3, \underline{r}_1; \omega) = \int_{S_R} d^2 r_2 2G(\underline{r}_3, \underline{r}_2; \omega) e^{-i\omega \tau_{re3}(\underline{r}_2, \underline{r}_1)} S(\underline{r}_2, \underline{r}_1; \omega) P_{re3}(\underline{r}_2, \underline{r}_1; \omega) \qquad (27)$$

$$c\tau_{re3}(\underline{r}_2, \underline{r}_1) = |\underline{r}_2 - \underline{r}_1| - r_1$$

$$P_{re3}(\underline{r}_2, \underline{r}_1; \omega) = \frac{1}{S(\underline{0}, \underline{r}_1; \omega)} \frac{r_1}{|\underline{r}_2 - \underline{r}_1|} \frac{L(\underline{r}_2, \underline{r}_1; \omega)}{L(\underline{0}, \underline{r}_1; \omega)} \frac{R(\underline{r}_2; \omega)}{R(\omega)}$$

where $L(r_2-r_1;\omega)$ is the attenuation of the Green's function due to acoustic absorption from point $r_1$ to $r_2$ in the homogeneous material, defined in Eq. (14). From the formula, we see that $H_{re3}(r_3,r_1;\omega)$ can be considered as an ultrasound beam excited by the pressure pulse $P_{re3}(r_2,r_1;\omega)$ filtered with $S(r_2,r_1;\omega)$, direction steered and focused by the delays $\tau_{re3}(r_2,r_1)$. In a practical implementation, $r_1$ is far from the array and $r_1 \approx r_f$. This allows the approximation $|r_2-r_1| \approx r_1$, and $L(r_2-r_1;\omega) \approx L(r_1;\omega)$. In addition we can approximate $R(r_2;\omega) \approx R(\omega)$, and $S(0,r_1;\omega) \approx 1$, giving $P_{re3}(r_2,r_1;\omega) \approx 1$.

Figure 11:
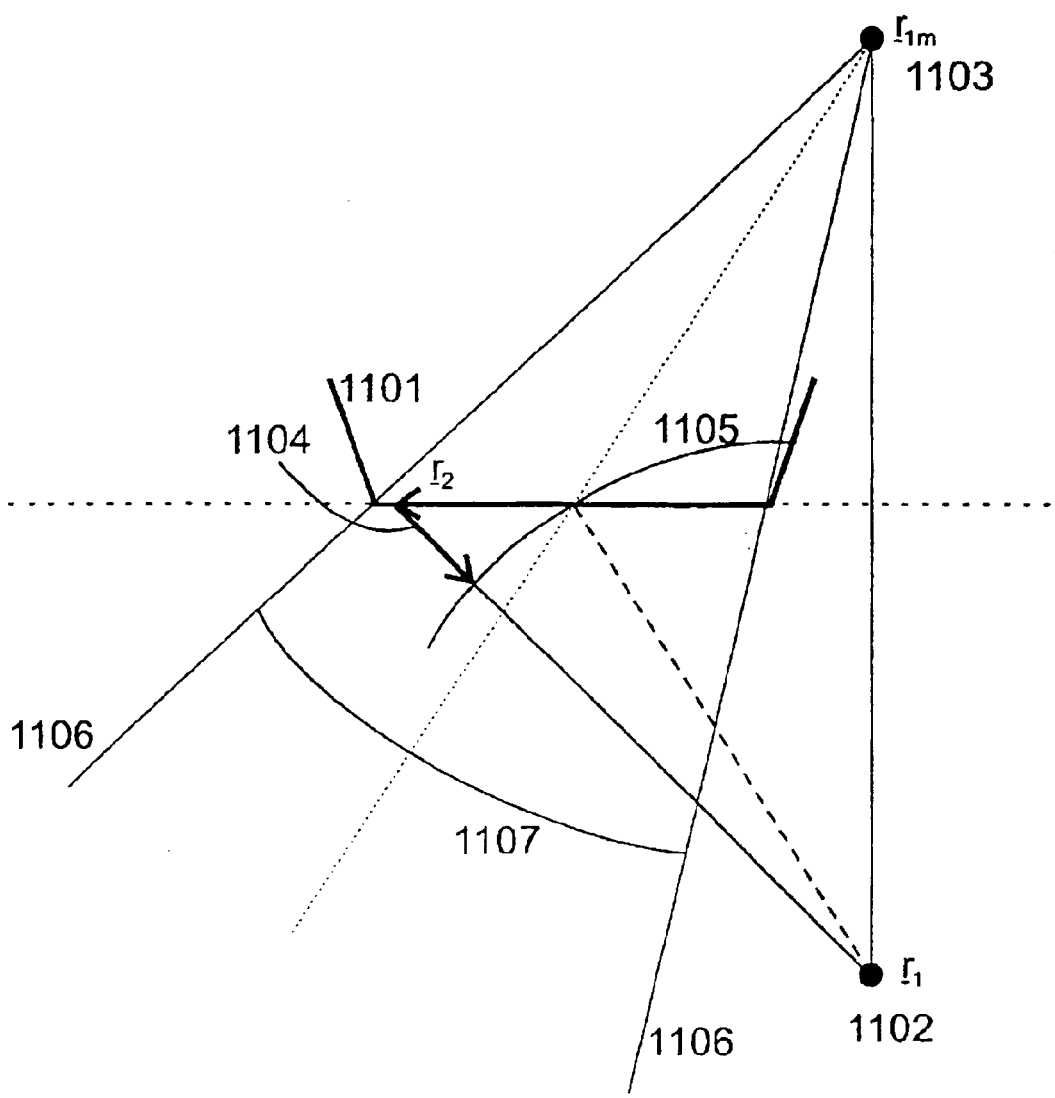
FIG. 11 illustrates delay settings for reverberation test beam that is focused at the mirror point of the transmit beam focus around the transducer surface.

FIG. 11 shows a side view of the ultrasound array as 1101 and the locus of $r_1$ is indicated as 1102. $c\tau_{re3}(r_2,r_1)$ is then found as the distance 1104 between the array surface at $r_2$ and the circle 1105 with radius $r_1$, centered at $r_1$. We notice from Eq. (24,27) that the delays $\tau_{re3}(r_2,r_1) = -\tau_r(r_2,r_1)$ where $\tau_r$ are the delays for focusing and steering the beam onto $r_f = r_1$. Such a delay steering produces a beam that is focused at the mirror image $r_{1m}$ (1103) of $r_1$ around the array surface, with the boundaries of the beam given approximately as 1106, with convex phase fronts 1107 centered at $r_{1m}$.

Inserting Eq. (27) into Eq. (24) we can rearrange the expression for $Y_{trr3}$ for Class III pulse reverberations as $$Y_{trr3}(\omega) = H_R(\omega) S_{n3}(\omega) S_{f3}(\omega) \qquad (28)$$

$$S_{f3}(\omega) = -k^2 P_r(\omega) ik \int_{V_f} d^3 r_1 2G(\underline{0}, \underline{r}_1; \omega) H_t(\underline{r}_1, \underline{r}_t; \omega) v(\underline{r}_1)$$

$$S_{n3}(\omega) = -k^2 P_r(\omega) ik \int_{V_n} d^3 r_3 H_r(\underline{r}_3, \underline{r}_f; \omega) H_{re3}(\underline{r}_3, \underline{r}_f; \omega) v(\underline{r}_3)$$

$$H_R(\omega) = \frac{R(\omega)}{P_r(\omega) + \max\{|P_r(\omega)|\}/SN} \approx \frac{R(\omega)}{P_r(\omega)}$$

where we have approximated $H_{re3}(r_3,r_1;\omega) \leq H_{re3}(r_3,r_f;\omega)$ for $r_1$ close to $r_f$, and $H_R(\omega)$ is a reflection coefficient filter. SN is a signal to noise power parameter selected so that $H_R(\omega)$ is a Wiener type approximation that gives $H_R(\omega) \sim R(\omega)/P_r(\omega)$ when $|P_r(\omega)| >> \text{Max}\{|P_r(\omega)|\}/SN$ and $H_R(\omega) \sim SN*R(\omega)/\max\{|P_r(\omega)|\}$ when $|P_r(\omega)| << \text{Max}\{|P_r(\omega)|\}/SN$.

$Y_{n3}(\omega)$ is the beam signal that is obtained from the near field region $V_n$ by transmitting the beam $H_{re3}(r_3,r_f;\omega)$ and receiving with the beam $H_r(r_3,r_f;\omega)$, and $Y_{f3}(\omega)$ is the receive beam signal from the object region $V_f$ around the transmit focus, obtained by transmitting with the beam $H_t(r_1,r_t;\omega)$ and receiving with the beam $2G(0,r_1;\omega)$. This receive beam can be approximated with a low aperture (wide focus) receive beam focused at $r_f$, with focal width larger than that of $H_t(r_1,r_t;\omega)$ and phase front that is approximately convex, spherical within $V_f$, centered at the array center. To obtain $Y_{n3}(\omega)$ and $Y_{f3}(\omega)$, one hence require two transmissions, for example a first transmission with the beam $H_{re3}(r_3,r_f;\omega)$ to obtain $Y_{n3}(\omega)$, with a second transmission with $H_t(r_1,r_t;\omega)$ to obtain $Y_{f3}(\omega)$. On the second transmission one can also in parallel receive with $H_r(r_1,r_f;\omega)$ to generate the first order receive corrected beam signal $Y_c(\omega)$ based on the reverberation corrected element/sub-aperture signal outputs from the unit 1205, which is further corrected for Class III reverberations by subtracting $Y_{trr3}(\omega)$ to the final corrected beam signal $Y_{c3}(\omega)$ as $$a)\ Y_{c3}(\omega) = Y_c(\omega) - Y_{trr3}(\omega) \qquad (29)$$

$$b)\ Y_c(\omega) = \int_{S_t} d^2 r_4 e^{-i\omega \tau_r(\underline{r}_4, \underline{r}_f)} H_{abc}(\underline{r}_4, \underline{r}_f; \omega) S_c(\underline{r}_4; \omega)$$

$$c\tau_r(\underline{r}_4, \underline{r}_f) = r_f - |\underline{r}_4 - \underline{r}_f|$$

where $S_c(r,\omega)$ is the Fourier transform of $s_c(r,t)$ defined in Eq. (11). With sub-aperture generation with a direction of the transmit beam $H_t(r_1,r_t;\omega)$ and the receive beam $H_r(r_3, r_t;\omega)$ given as 506 in FIG. 5, we see from the expression for $\tau_{re3}(r_2,r_1)$ in Eq. (27) and FIG. 11 that the sub-aperture directions for $H_{re3}(r_3,r_t;\omega)$ is along 508.

When $H_r(r_3,r_t;\omega)=H_t(r_3,r_t;\omega)$ we can obtain $Y_{n3}(\omega)$ from the near field region $V_n$ by transmitting the beam $H_t(r_3,r_t;\omega)$ and receiving with the beam $H_{re3}(r_3,r_t;\omega)$. In this case we can hence obtain both $Y_{n3}(\omega)$ and $Y_{f3}(\omega)$ through transmitting with the same beam $H_t(r,r_t;\omega)$, and receiving with $H_{re3}(r_3,r_t;\omega)$ from $V_n$ for $Y_{n3}(\omega)$, and receiving with $2G(0, r_1;\omega)$ from $V_f$ for $Y_{f3}(\omega)$. In case there is no reverberation correction on the element signals according to Eq. (11,12) one will correct, when $H_r(r_3,r_t;\omega)=H_t(r_3,r_t;\omega)$, for both Class II and Class III reverberations in the beam signal by subtracting $2Y_{trr3}(\omega)$ from the beam signal in Eq. (29a).

The generation of receive beams $H_{re3}(r_3,r_t;\omega)$ and $2G(0, r_1;\omega)$ is done with parallel units to 1208, 1210, 1214 in FIG. 12, and the final beam processing according to Eqs. (28,29) are done in unit 1216 of FIG. 12. One should note that the attenuation of the Class III reverberations according to Eqs. (28,29) do not reduce the reverberation noise in the element/sub-aperture signals 1209 that is one input to the estimation unit 1211 of the phase front aberration corrections. However, in some schemes the estimation of the phase aberration corrections are based on correlations between the element/sub-aperture signals and the final beam sum signal. In such situations, the beam signal processing according to Eqs. (28,29) will reduce the effect of Class III reverberations on the estimates of the phase aberration corrections.

If the approximation $P_r(r;\omega) \approx P_r(\omega)$ can not be done in Eq. (25), $P_r(r;\omega)$ must be carried under the integral. Similarly, one can carry an element variable reflection coefficient $R(r_2;\omega)$ under the integral of $H_{re3}$ in Eq. (26–27). The reflection coefficient filtering in Eq. (28) should then be done on the element signals before forming the beam $H_{re3}$ in Eq. (28).

Direct reduction of the Class III reverberations in the element/sub-aperture signals can be done through modification of Eq. (23) as $$S_{trr3}(r;\omega) = H_R(\omega) S_{n3}(r;\omega) S_{f3}(\omega)$$

$$S_{n3}(r;\omega) = -k^2 P_r(r;\omega)ik \int_{V_n} d^3 r_3 2G(r,r_3;\omega) H_{re3}(r_3,r_f;\omega) v(r_3) \quad (30)$$

$$S_{f3}(\omega) = -k^2 P_r(\omega)ik \int_{V_f} d^3 r_1 2G(\underline{0},r_1;\omega) H_t(r_1,r_t;\omega) v(r_1)$$

where we see that $S_{n3}(r;\omega)$ is obtained as the near field signal on the element at r from the transmitted beam $H_{re3}(r_3,r_f;\omega)$, and $S_{f3}(\omega)$ is the signal at r=0 obtained from scatterers around $V_f$ from the transmitted beam $H_t(r_1,r_t;\omega)$. The element signals are then corrected for Class III reverberations by subtracting $S_{trr3}(r;\omega)$ from $S(r;\omega)$ or $S_c(r;\omega)$ of Eq. (11), where $S_c(r;\omega)$ also gives the correction for the Class I and Class II reverberations. (Note that capital letters $S_c(r;\omega)$ denotes the temporal Fourier transform of $s_c(r;t)$).

In Eq. (30) one could also use individual reflection coefficient filters $H_R(r,\omega)$ for each element to allow for variations in the reflection coefficient and transfer functions between the elements in some arrays. The individual filters could be stored in the array probe and transferred to the instrument via the probe connector. Individual reflection coefficient filters for each element could also be used with the beam signals of Eq. (28), where the filtering must be done on the elements before forming the beams of one of $Y_{n3}$ or $Y_{f3}$. We view it as within reach of anyone skilled in the art to introduce such variations and modifications of details in the procedures.

When $H_r(r_3,r_t;\omega) \neq H_t(r_3,r_t;\omega)$, one can estimate the Class II reverberations in a similar way as the Class III reverberations in Eq. (28,29), where we start by pulling $R(\omega)2G(r_3,0;\omega)$ out of the integral for $H_{rev}$, similar to what is done in Eq. (26). Further carrying through the calculations as above, we get the following estimate for the Class II reverberations $$Y_{trr2}(\omega) = H_R(\omega) S_{f2}(\omega) S_{n2}(\omega) \quad (31)$$

$$S_{n2}(\omega) = -k^2 P_r(\omega)ik \int_{V_n} d^3 r_1 H_{re2}(r_f,r_1;\omega) H_t(r_1,r_t;\omega) v(r_1)$$

$$S_{f2}(\omega) = -k^2 P_r(\omega)ik \int_{V_f} d^3 r_3 H_r(r_3,r_f;\omega) 2G(\underline{0},r_3;\omega) v(r_3)$$

$$H_{re2}(r_f,r_1;\omega) =$$

$$\int_{S_t} d^2 r_2 2G(r_2,r_1;\omega) e^{-i\omega\tau_{re2}(r_2,r_f)} S(r_f,r_2;\omega) P_{re2}(r_2,r_f;\omega)$$

$$c\tau_{re2}(r_2,r_f) = |r_2 - r_f| - r_f$$

$$P_{re2}(r_2,r_f;\omega) = \frac{1}{S(\underline{0},r_f;\omega)} \frac{r_f}{|r_2 - r_f|} \frac{L(r_2,r_f;\omega)}{L(\underline{0},r_f;\omega)} \frac{R(r_f;\omega)}{R(\omega)}$$

The Class II reverberation correction is then done by subtracting $Y_{trr2}(\omega)$ from the uncorrected beam signal analogous to for Class III reverberations in Eq. (29). As $2G(0,r_3;\omega)$ is a very wide spread beam, it is advantageous to approximate this beam with a low aperture beam, slightly focused at $r_f$ so the focal beam width is larger than that of $H_r(r_3,r_f;\omega)$. The phase of this beam will be approximately spherical, centered at the array center, within the focal region $V_f$. One can then choose to transmit this beam, and listen with $H_r(r_3,r_f;\omega)$, or transmit $H_r(r_3,r_f;\omega)$ and listen with said beam to obtain $Y_{f2}$.

Comparing Eqs. (28,31), we see that they correspond to each other in that $H_t(r,r_t;\omega)$ is in both Equations related to the first scatterer, and $H_r(r,r_f;\omega)$ is in both Equations related to the last scatterer. The beam $2G(0,r_x;\omega)$, x=1 or 3, relates to the scatterer in the object region $V_f$ far from the transducer, while the beam $H_{rem}(r,r_f;\omega)$, m=2 or 3, relates to the scatterer in the near field region $V_n$. For Class III reverberations, the first scatterer is in the object, far from the transducer, while the last scatterer is in the near field, while for Class II reverberations the first scatterer is in the near field while the last scatterer is in the far field. Hence, $Y_{n3}$ for Class III reverberations involves $H_r(r_3,r_f;\omega)$ and $H_{re3}(r_3,r_f;\omega)$, and $Y_{f3}$ involves $H_t(r_1,r_t;\omega)$ and $2G(0,r_1;\omega)$. For Class II reverberations $Y_{n2}$ involves $H_t(r_1,r_t;\omega)$ and $H_{re2}(r_1,r_f;\omega)$, and $Y_{f2}$ involves $H_r(r_3,r_f;\omega)$ and $2G(0,r_3;\omega)$. Analogous to Eq. (30) for Class III scatterers one can establish a model for the element signals of the Class II reverberations as $$S_{trr2}(r;\omega) = H_R(\omega) S_{n2}(r;\omega) S_{f2}(\omega) \quad (32)$$

$$S_{f2}(r;\omega) = -k^2 P_r(r;\omega)ik \int_{V_f} d^3 r_3 2G(r,r_e;\omega) 2G(\underline{0},r_3;\omega) v(r_3)$$

$$S_{n2}(\omega) = -k^2 P_r(\omega)ik \int_{V_n} d^3 r_1 H_{re2}(r_1,r_f;\omega) H_t(r_1,r_t;\omega) v(r_1)$$

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, one can transmit wide or multiple transmit beams and operate several receive and aberration estimation and correction units in parallel for several beam directions, where the unit 1208 performs delay adjustments for several receive beam directions in parallel, and directing the delay adjusted signals to their respective parallel receive estimation and correction units. One can also do the delay and delay adjustments of unit 1208 and aberration estimation and corrections of units 1211 and 1212 in a hierarchical manner where neighboring sub-apertures are delay adjusted and corrected and summed into a higher level sub-aperture signal where neighbors of the new sub-apertures in a next level are delay adjusted and corrected and summed into a higher level sub-apertures, and so on until all the original sub-apertures have been combined to one beam signal or several parallel beam signals.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for correcting pulse reverberations in a received signal along a direction of each image beam during ultrasound imaging, comprising the steps of:
    forming ultrasound beams for at least one of transmittal or reception by an ultrasound transducer array having a one or two-dimensional distribution of elements, and
    adjusting an active transmit aperture of the transducer array to form a transmit beam that minimizes transmitted energy that collides with highly reflective materials that produce pulse reverberations in the received signal to ensure an adequate level of spatial resolution in an ultrasound image.

2. The method for correcting pulse reverberations during ultrasound imaging according to claim 1, wherein the active transmit aperture is manually adjusted, and the ultrasound image is used to determine a balance between a reduction in pulse reverberation noise and a reduction of image resolution.

3. The method for correcting pulse reverberations during ultrasound imaging according to claim 1, wherein the active transmit aperture is automatically adjusted based on a total energy in a back scattered signal to a specific depth in a defined region.

4. The method for correcting phase-front aberrations during ultrasound imaging, wherein prior to estimation of correction filters or approximate delay the pulse reverberations in the ultrasound signal are first reduced according to the method of claim 1, and amplitude corrections for the front aberrations are performed using sub-aperture or element signals along with the reduced pulse reverberations.

5. A method for correcting Class I and Class II pulse reverberations in a received signal along a direction of each image beam during ultrasound imaging, where ultrasound beams on at least one of transmittal or reception are formed with an ultrasound transducer array having a two-dimensional distribution of elements, the method comprising the steps of:
    grouping array elements of the transducer array during the at least one of transmittal or reception into sub-apertures, a same signal being transmitted on each sub-aperture element during the transmittal with at least one of individual delay or amplitude corrections so that sub-aperture transmit beams are formed, and during the reception the signals from individual elements after at least one of a delay or amplitude corrections are summed into received sub-aperture signals so that received sub-aperture beams are formed, dimensions of the sub-apertures being less than a spatial correlation length of pulse reverberation wave fronts at the transducer array,
    driving the transducer elements with a $1^{st}$ set of transmit pulses for directional steering and focusing of the beam in said direction of the image beam during a $1^{st}$ transmit event,
    recording a set of $1^{st}$ received sub-aperture signals from the $1^{st}$ transmit event, a set of $1^{st}$ received sub-aperture beams being directed in a mirror direction to the direction of said image beam about a normal to each sub-aperture, and
    filtering an initial interval of each of the $1^{st}$ sub aperture received signals in corresponding reverberation correction filters to generate a set of reverberation correction transmit signals corresponding to each sub-aperture, each of said reverberation correction transmit signals being transmitted at a corresponding sub-aperture in a $2^{nd}$ transmit event.

6. A method for correcting pulse reverberations during ultrasound imaging according to claim 5, further comprising the steps of:
    combining and storing received signal elements from said $1^{st}$ transmit event with a set of $2^{nd}$ received sub-aperture signals, directions of said $2^{nd}$ received sub-aperture beams being in the direction of said image beam,
    transmitting reverberation correction transmit signals in said $2^{nd}$ transmit event for each corresponding sub-aperture, the direction of the $2^{nd}$ sub-aperture beam being in the direction of the image beam,
    combining received signal elements from said $2^{nd}$ transmit event into a set of $3^{rd}$ received sub-aperture signals, a direction of the $3^{rd}$ received sub-aperture beams being in the same direction as the $2^{nd}$ received sub-aperture beams, and
    combining said set of $2^{nd}$ received sub-aperture signals and said set of $3^{rd}$ received sub-aperture signals to create a set of reverberation corrected sub-aperture signals that is used for further processing of image data along said direction of the image beam.

7. The method for correcting pulse reverberations during ultrasound imaging according to claim 5, further comprising the steps of:
    transmitting a synchronized combination of said set of $1^{st}$ transmit pulses during said $2^{nd}$ transmit event for each sub-aperture followed by said corresponding reverberation correction transmit signal for each sub-aperture, said direction of the sub-aperture transmit beam being in the same direction of said image beam, and
    combining received signal elements from said $2^{nd}$ transmit event into a set of $2^{nd}$ received sub-aperture signals, said direction of the $2^{nd}$ received sub-aperture beam being in the same direction as said image beam, wherein said set of $2^{nd}$ received sub-aperture signals are used as reverberation corrected sub-aperture signals for further processing of image data along said direction of the image beam.

8. The method for correcting pulse reverberations during ultrasound imaging according to claim 5, wherein the sub-apertures comprise one element, and all sub-aperture beam directions are given by the beam direction of the elements.

9. The method for correcting pulse reverberations during ultrasound imaging according to claim 5, wherein said reverberation correction filter responses are adapted to individual transducer arrays and elements are stored in a memory circuit in an array probe or a probe connector for reading into an imaging instrument via an array probe connector.

10. A method for correcting Class II or Class III pulse reverberations in a received beam signal during ultrasound imaging for an image range interval around a receive focus $r_f$ along each image beam direction, where ultrasound beams on at least one of transmittal or reception are formed with an ultrasound transducer array having a two-dimensional distribution of elements, and for each image beam direction, the method comprising the steps of:

A:
transmitting into tissue a $1^{st}$ pulsed transmit beam with focus at $r_t$ along the image beam direction, forming a $1^{st}$ received beam signal from array signal elements received from said $1^{st}$ transmit beam, the $1^{st}$ received beam being focused at $r_f$ along the image beam direction, to form a basis for estimating a reverberation corrected image signal for said image range interval around $r_f$, and forming a $2^{nd}$ received beam signal from array signal elements received from said $1^{st}$ transmitted beam with a $2^{nd}$ received beam spatial response, B:
transmitting a $2^{nd}$ pulsed transmit beam with a $2^{nd}$ transmit beam spatial response, and forming a $3^{rd}$ received beam signal from the array signal elements received from said $2^{nd}$ transmit beam with a $3^{rd}$ received beam spatial response, and C:
forming a $4^{th}$ signal by filtering said $2^{nd}$ received beam signal with said $3^{rd}$ received beam signal for further filtering with a reflection coefficient filter to form an estimate of pulse reverberations in said $1^{st}$ received beam signal in said image range interval around $r_f$, wherein reverberation corrections of said $1^{st}$ received beam signal are obtained by subtracting said $4^{th}$ signal from said $1^{st}$ received beam signal to form a reverberation corrected beam signal of the ultrasound image in said image range interval around $r_f$ along said image beam direction.

11. The method for correcting Class II pulse reverberations in the received beam signal during ultrasound imaging according to claim 10, wherein within said image range interval said $2^{nd}$ received beam spatial response has convex spherical phase fronts centered around a center of the array, said $2^{nd}$ transmit beam spatial response is equal to said $1^{st}$ received beam spatial response, and said $3^{rd}$ received beam spatial response has a focus as a mirror point of $r_f$ around a reflecting face of the array.

12. The method for correcting Class II or Class III pulse reverberation in the received beam signal during ultrasound imaging according to claim 11, wherein a focus of the $1^{st}$ received beam focus $r_f$ moves rapidly outwards from the array so that the focus follows a first order scattering from the $1^{st}$ transmit pulse to form a dynamic focusing of the received beam signal, and a focus of the received beam having a focus as a mirror point of $r_f$ around a reflecting face of the array dynamically follows the focus of the $1^{st}$ received beam.

13. The method for correcting Class III pulse reverberations in the received beam signal during ultrasound imaging according to claim 10, wherein within said image range interval said $2^{nd}$ received beam spatial response has convex spherical phase fronts centered around a center of the array, said $2^{nd}$ transmit beam spatial response has a focus as a mirror point of $r_f$ around a reflecting face of the array, and said $3^{rd}$ received beam spatial response is equal to said $1^{st}$ received beam spatial response.

14. The method for correcting Class II pulse reverberations in the received beam signal during ultrasound imaging according to claim 10, wherein said $2^{nd}$ received beam spatial response has a focus as a mirror point of $r_f$ around a reflecting face of the array, within said image range said $2^{nd}$ transmit beam spatial response has convex spherical phase fronts centered at a center of a surface of the array, and said $3^{rd}$ received beam spatial response is equal to said $1^{st}$ received beam spatial response.

15. The method for correcting Class II pulse reverberations in the received beam signal during ultrasound imaging according to claim 10, wherein said $2^{nd}$ received beam spatial response has a focus as a mirror point of $r_f$ around a reflecting face of the array, said $2^{nd}$ transmit beam spatial response is equal to said $1^{st}$ received beam spatial response, and in said image range said $3^{rd}$ received beam spatial response has convex spherical phase fronts centered at a center of a surface of the array.

16. The method for correcting pulse reverberations in the received signal during ultrasound imaging according to claim 10, wherein step A and B are reversed in their order of occurrence.

17. The method for correcting Class II or Class III pulse reverberations in the received beam signal during ultrasound imaging according to claim 10, wherein said $1^{st}$ received beam spatial response is equal to said $1^{st}$ transmit beam spatial response, within said image range interval said $2^{nd}$ received beam spatial response has convex, spherical phase fronts centered around a center of the array, said $2^{nd}$ transmit beam spatial response is equal to said $1^{st}$ transmit beam spatial response, so that said $3^{rd}$ received beam signal is formable from the received signal elements of the $1^{st}$ transmit beam so that the $2^{st}$ transmission is omittable, said $3^{rd}$ received beam spatial response having a focus as a mirror point around an array reflecting face of a focus of said $1^{st}$ received beam.

18. The method for correcting Class II or Class III pulse reverberations in the received beam signal in each image beam direction during ultrasound imaging, wherein a range along each image beam is divided into multiple image range intervals where the reverberation corrected receive beam signal for each interval is obtained according to claim 17, each interval has separate transmit pulses and received signals, and said $1^{st}$ transmit beams is focused inside an actual interval to obtain the reverberation corrected beam signal for said interval.

19. The method for correcting pulse reverberations during ultrasound imaging according to claim 10, wherein individual reflection coefficient filters are applied for each at least one transmitted or received signal element or sub-aperture signal before forming the beam with a focus as a mirror point of $r_f$, and filtering with the refection coefficient filter in a final stage of forming said $4^{th}$ signal is avoided.

20. The method for correcting pulse reverberations during ultrasound imaging according to claim 10, wherein said receive beam signals are obtained from sub-aperture signals that are formed from received signal elements.

21. The method for correcting pulse reverberations during ultrasound imaging according to claim 10, wherein reflection coefficient filter parameters for at least one of individual arrays, array elements, or array sub-apertures are stored in each array probe and read into an imaging instrument via a probe connector.

22. The method for correcting Class III pulse reverberations in a received element or sub-aperture signals during ultrasound imaging for an image range interval around $r_f$ along each image beam direction, where ultrasound beams on at least one of transmittal or reception are formed with an ultrasound transducer array having a two-dimensional distribution of elements, and for each image beam direction, the method comprising the steps of:

A:

transmitting a $1^{st}$ pulsed transmit beam into tissue with a focus at $r_t$ along the image beam direction, and recording a $1^{st}$ received element or sub-aperture signal received from said $1^{st}$ transmit beam, the $1^{st}$ received sub-aperture signal being directed along a direction of the image beam, to form a basis for estimating a reverberation corrected element or sub-aperture signal for said image range interval around $r_f$, and for forming a $2^{nd}$ received beam signal from array signal elements received from said $1^{st}$ transmit beam, within said image range interval the $2^{nd}$ received beam spatial response has convex spherical phase fronts centered around a center of the array,

B:

transmitting a $2^{nd}$ pulsed transmit beam into the tissue, said $2^{nd}$ beam having a focus as a mirror point of $r_f$ around a reflecting face of the array,

C:

recording a $3^{rd}$ received element or sub-aperture signals received from said $2^{nd}$ transmit beam, the $3^{rd}$ received sub-apertures being directed along said direction of the image beam, and

D:

forming a $4^{th}$ element or sub-aperture signals by filtering said $2^{nd}$ received beam signal with said $3^{rd}$ received elements or sub-aperture signals for further filtering with a reflection coefficient filter to form an estimate of Class III pulse reverberations in said $1^{st}$ received element or sub-aperture signals in said image range interval around $r_f$, wherein reverberation corrections of said $1^{st}$ received element or sub-aperture signals are obtained by subtracting said $4^{th}$ element or sub-aperture signals from said $1^{st}$ received element or sub-aperture signals to form reverberation corrected received elements or sub-aperture signals of the ultrasound image in said image range interval around $r_f$ along said direction of the image beam.

* * * * *